United States Patent
Kumar

(10) Patent No.: US 10,204,058 B2
(45) Date of Patent: Feb. 12, 2019

(54) GPU SHARED VIRTUAL MEMORY WORKING SET MANAGEMENT

(71) Applicant: Apple Inc., Cupertino, CA (US)

(72) Inventor: Derek R. Kumar, Cupertino, CA (US)

(73) Assignee: Apple Inc., Cupertino, CA (US)

(*) Notice: Subject to any disclaimer, the term of this patent is extended or adjusted under 35 U.S.C. 154(b) by 71 days.

(21) Appl. No.: 15/337,526

(22) Filed: Oct. 28, 2016

(65) Prior Publication Data

US 2017/0060743 A1 Mar. 2, 2017

Related U.S. Application Data

(62) Division of application No. 14/262,475, filed on Apr. 25, 2014, now Pat. No. 9,507,726.

(51) Int. Cl.
*G06F 12/1009* (2016.01)
*G06F 12/0804* (2016.01)
*G06F 12/1045* (2016.01)

(52) U.S. Cl.
CPC ...... *G06F 12/1009* (2013.01); *G06F 12/0804* (2013.01); *G06F 12/1045* (2013.01); *G06F 2212/1041* (2013.01); *G06F 2212/455* (2013.01); *G06F 2212/657* (2013.01); *G06F 2212/68* (2013.01)

(58) Field of Classification Search
CPC ............ G06F 12/1009; G06F 12/1045; G06F 12/0804; G06F 2212/455; G06F 2212/68; G06F 2212/1041; G06F 2212/657
See application file for complete search history.

(56) References Cited

U.S. PATENT DOCUMENTS

| | | |
|---|---|---|
| 6,301,648 B1 | 10/2001 | Campbell |
| 6,886,085 B1 | 4/2005 | Shuf |
| 7,528,838 B2 | 5/2009 | Gosalia et al. |
| 7,710,424 B1 | 5/2010 | Hutchins et al. |
| 8,035,648 B1 | 10/2011 | Wloka et al. |
| 8,397,049 B2 | 3/2013 | Wang et al. |
| 8,397,241 B2 | 3/2013 | Xiaocheng et al. |
| 8,451,281 B2 | 5/2013 | Ginzburg |
| 9,153,211 B1 | 10/2015 | Deming |
| 2006/0164425 A1 | 7/2006 | Parke |
| 2008/0028181 A1 | 1/2008 | Tong et al. |
| 2008/0276067 A1 | 11/2008 | Chen et al. |
| 2010/0217951 A1* | 8/2010 | Pan .................... G06F 12/10 711/206 |
| 2011/0004739 A1 | 1/2011 | Hohmuth |
| 2011/0010521 A1 | 1/2011 | Wang |
| 2011/0153957 A1 | 6/2011 | Gao et al. |
| 2011/0161619 A1 | 6/2011 | Kaminski et al. |

(Continued)

*Primary Examiner* — Maurice L. McDowell, Jr.
(74) *Attorney, Agent, or Firm* — Womble Bond Dickinson (US) LLP

(57) ABSTRACT

A method and apparatus of a device that manages virtual memory for a graphics processing unit is described. In an exemplary embodiment, the device manages a graphics processing unit working set of pages. In this embodiment, the device determines the set of pages of the device to be analyzed, where the device includes a central processing unit and the graphics processing unit. The device additionally classifies the set of pages based on a graphics processing unit activity associated with the set of pages and evicts a page of the set of pages based on the classifying.

20 Claims, 21 Drawing Sheets

(56) References Cited

U.S. PATENT DOCUMENTS

| | | |
|---|---|---|
| 2011/0252200 A1 | 10/2011 | Hendry et al. |
| 2012/0233439 A1 | 9/2012 | Ginzburg et al. |
| 2013/0016109 A1 | 1/2013 | Garanzha |
| 2013/0024597 A1 | 1/2013 | Loh |
| 2013/0227245 A1 | 8/2013 | Gupta |
| 2013/0339659 A1 | 12/2013 | Bybell |
| 2014/0040593 A1 | 2/2014 | Sharp |
| 2014/0181461 A1 | 6/2014 | Kegel |
| 2014/0281352 A1 | 9/2014 | Venkatsubramanian |
| 2014/0331019 A1 | 11/2014 | Parker |
| 2015/0169439 A1* | 6/2015 | Torrant ................ G06F 12/126 711/103 |
| 2017/0199689 A1* | 7/2017 | Mashey ................ G06F 3/0622 |

* cited by examiner

GPU SHARED VIRTUAL MEMORY WORKING SET MANAGEMENT

This application is a divisional of co-pending U.S. application Ser. No. 14/262,475 filed on Apr. 25, 2014.

FIELD OF INVENTION

This invention relates generally to memory management and more particularly to managing virtual memory by sharing page tables between a graphic processing unit and a central processing unit.

BACKGROUND OF THE INVENTION

A device can have one or more central processing units (CPUs) and one or more graphics processing units (GPUs). Each of the CPUs is a general-purpose processing device such as a microprocessor or another type of processor and is used for general computing tasks of the device. In addition, each of the CPUs is a specialized electronic circuit designed to rapidly manipulate and alter memory to accelerate the creation of images in a frame buffer intended for output to a display. Recently, these GPUs can be used as general-purpose computation on GPUs for a computer task. A general-purpose computation GPUs is the utilization of a CPU, which typically handles computation only for computer graphics, to perform computation in processes traditionally handled by the CPU. For example, a CPU providing a functional set of operations performed on arbitrary bits can be used for general-purpose computation on CPUs. Additionally, the use of multiple graphics cards in one computer, or large numbers of graphics chips, further parallelizes the already parallel nature of graphics processing. For example, a GPU can be used for an OpenCL or a Compute Unified Device Architecture (CUDA) compute task.

A problem for general-purpose computation on GPUs is that the physical memory for the object being accessed by a GPU needs to be pinned so that the object memory cannot be paged out to disk. This is because the GPU cannot access the object memory using the virtual memory address of the object memory. By pinning the object memory, this adds memory pressure to the device, because the operating system cannot page this memory out to disk storage. For example, if the object is an image or another graphics object, the memory object is pinned can be quite large.

SUMMARY OF THE DESCRIPTION

A method and apparatus of a device that manages virtual memory for a graphics processing unit is described. In an exemplary embodiment, the device tracks virtual memory access by a graphics processing unit of the device. In this embodiment, the device detects access to a virtual memory address by a processing unit, where the device includes a central processing unit and the graphics processing unit that are each able to access the virtual memory address. In addition, the device determines if the processing unit is a graphic processing unit. If the processing unit is the graphics processing unit, the device further sets a graphics processing unit reference bit in a page table entry of a page table that corresponds to the virtual memory address.

In another embodiment, the device manages a graphics processing unit working set of pages. In this embodiment, the device determines a set of pages of the device to be analyzed, where the device includes a central processing unit and the graphics processing unit. The device additionally classifies the set of pages based on a graphics processing unit activity associated with the set of pages and evicts a page of the set of pages based on the classification.

In a further embodiment, the device processes a graphics processing unit page fault. In this embodiment, the device detecting a page fault of a process associated with a first page that stores content of a memory object. The device further determines if the page fault is associated with a graphics processing unit operation. If the page fault is associated with a graphics processing unit operation, the device analyzes the memory object for domain information of the memory object. In addition, the device pre-fetches a second page associated with the memory object into physical memory and maps the second page to virtual memory of the process.

In another embodiment, the device performs translation lookaside buffer coherency for a translation lookaside buffer of a graphics processing unit of the device. In this embodiment, the device receives a request to remove an entry of the translation lookaside buffer of the graphics processing unit, where the device includes a central processing unit and the graphics processing unit. In addition, the entry includes a translation of virtual memory address of a process to a physical memory address of system memory of a central processing unit and the graphics processing unit is executing a compute task of the process. The device locates the entry in the translation lookaside buffer and removes the entry.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
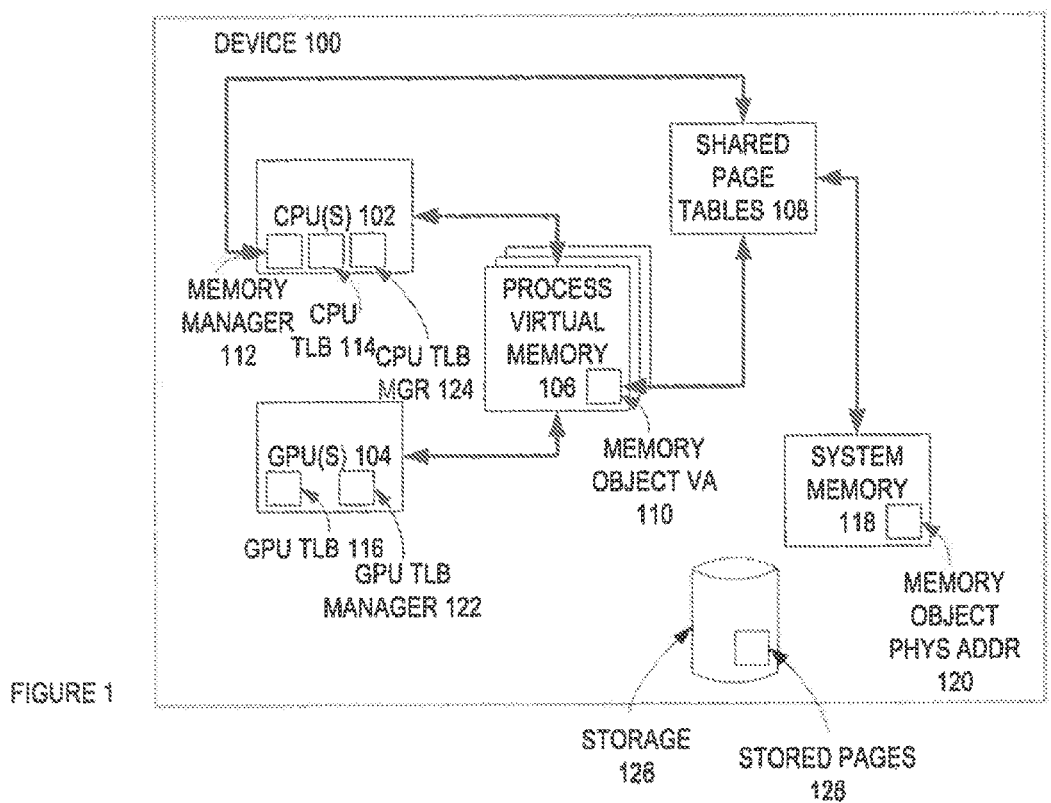
FIG. 1 is a block diagram of one embodiment of a device that allows a graphics processing unit (GPU) to use virtual memory address to address an object stored in memory.

A method and apparatus of a device that manages virtual memory for a graphics processing unit is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the tee ins "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, sonic operations may be performed in parallel rather than sequentially.

The terms "server," "client," and "device" are intended to refer generally to data processing systems rather than specifically to a particular form factor for the server, client, and/or device.

A method and apparatus of a device that manages virtual memory for a graphics processing unit is described. In one embodiment, the device includes a shared page table that is used by the device share the virtual address to physical address translations of running processes between the central processing unit(s) (CPUs) and the graphics processing unit(s) (GPUs). By sharing the virtual address translations between the CPUs and GPUs of the device, the GPU can use the virtual addressing of the process when the GPU is executing a computing task of that process. In addition, the memory of the objects being operated on by the GPU can be evicted and stored in persistent storage as needed by the memory manager of the device.

In one embodiment, the device includes a memory manager that tracks the virtual memory access by GPU, manages a GPU working set of pages, processes a GPU page fault, and performs translation lookaside buffer coherency for a translation lookaside buffer (TLB) of the GPU. In one embodiment, the memory manager tracks the virtual memory access of the GPU by setting a GPU reference bit in a page table entry of the shared page table. An access can be a read of the virtual memory, writing to the virtual memory, a GPU shader program accessing virtual memory, or another type of access. In this embodiment, the GPU reference bit indicates that the GPU has accessed the virtual memory associated with the page table entry. By tracking the accesses of the virtual memory by the GPU, the memory manager can use this information to manager the GPU working set.

In another embodiment, the memory manager manages the GPU working set. In one embodiment, the GPU working set is the set of pages that are actively being used by the GPU. In this embodiment, the GPU working set is distinct from the CPU working set, although in some embodiments, the GPU and CPU working sets can intersect. In addition, a GPU allocation set is the set of physical page frames that were allocated either exclusively or partially on behalf of GPU operations by the OS memory manager. In this embodiment, the memory manager classifies a set of pages resident in the physical memory of the device based on the GPU activity associated with teach pages. In addition, each of the pages can be further classified based on whether that page was modified. Using the classification, the memory manager can evict one or more pages from one or more of the classified pages. For example and in one embodiment, the memory manager can classify each of the set of pages as whether the GPU reference bit was set and if the modified bit was set, giving four different classes. In this example, the memory manager can use a least recently used algorithm to determine which of the page(s) to evict and also which class of pages to evict first. If this example, the class of pages with the GPU reference and modify bit set is the highest class and the class of pages with the GPU reference and modify bit not set is the lowest class. The memory manager randomly selects one or more pages from the lowest class of pages to evict.

In a further embodiment, the memory manager handles CPU pages faults. In one embodiment, a GPU page fault is a GPU access of a virtual address that corresponds to a page that is stored on persistent storage. The memory manager detects this condition and generates a page fault so that the memory manager can retrieve the page from the persistent storage and load this page into physical memory. In one embodiment, during the page fault, the memory manager can further analyze the memory object associated with the page fault for domain and/or historical information. In one embodiment, the domain information is the spatial and/or timeline information of the contents of the memory and the historical information is the historical access pattern of the memory object. For example and in one embodiment, the domain information could be information that describes the spatial information of a texture. Using this domain and/or historical information, the memory manager can pre-fetch pages that are likely to be accessed in the future for this memory object and preemptively maps the pre-fetched pages into the physical memory. Pre-fetching and mapping the stored pages helps reduce the number of page faults generated by the memory manager.

In another embodiment, the memory manager performs TLB coherency so that the TLB for each CPU and/or GPU have consistent data. In one embodiment, TLB coherency is performed when the memory manager detects an invalid virtual address translation. In one embodiment, an invalid virtual address translation is a virtual address translation for a virtual address that corresponds to a page that is stored in persistent storage. In addition, the page may be simply killed if the page is a "read-only" page that does not need to be written out (e.g., a bitmap image, texture, or other type of read-only structure). In another embodiment, if the operating system is performing an operation where the page contents need to be "stable", such as copying the memory and needs a coherent snapshot of the memory without interference by another CPU or GPU, the memory manager may invalidate the translations for corresponding memory addresses. In a further embodiment, translations can be invalidated if there is an illegal access from the CPU, or there is a copy of content for a copy-on-write. For example and in one embodiment, the virtual address translations can be become invalid if the page corresponding to the virtual address is paged out and stored in persistent storage. If the memory manager detects an invalid virtual translation, the memory manager sends a request to each CPU and/or GPU to delete this virtual address translation. In one embodiment, each CPU and/or GPU includes a TLB manager that receives the request and deletes the virtual address translation from the local TLB, FIG. 1 is a block diagram of one embodiment of a device 100 that allows a graphics processing unit (GPU) 104 to use virtual memory address to address an object stored in memory. In one embodiment, the device 100 can be a personal computer, laptop, server, mobile device (e.g., smartphone, laptop, personal digital assistant, music playing device, gaming device, etc.), network element (e.g., router, switch, gateway, etc.), and/or any device capable of executing multiple applications. In one embodiment, the device 100 can be a physical or virtual device. In FIG. 1, the device 100 includes a central processing unit (CPU) 102, a graphics processing unit (GPU) 104, process(es) virtual memory 106, shared page tables 108, system memory 118, and persistent storage 126. While in one embodiment, the device 100 includes one CPU 102 and GPU 104, in alternative embodiments, the device includes multiple CPUs 102 and/or multiple GPUs 104. In one embodiment, a CPU 102 is hardware that carries out instructions being executed on the device 100.

In one embodiment, the CPU 102 is a general-purpose processing device such as a microprocessor or another type of processor, More particularly, the CPU 102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The central processing unit (CPU) 102 may also be one or more special-purpose processing devices such as an application specific integrated circuit (ASIC), a field programmable gate array (FPGA), digital signal processor (DSP), network processor, or the like. In one embodiment, the CPU 102 can include one or more CPUs and each of the CPUs can include one or more processing cores.

In one embodiment, a GPU 104 is a specialized electronic circuit designed to rapidly manipulate and alter memory to accelerate the creation of images in a frame buffer intended for output to a display. In another embodiment, the GPU 104 can be used for other general purpose computing, such as general purpose computing on graphics processing unit. In this embodiment, the general purpose computing on graphics processing unit is the utilization of a graphics processing unit to perform computations in applications traditionally handled by a central processing unit. For example and in one embodiment, a graphics processing unit can be used for stream processing that is performing the same or similar operation on a set of records (e.g., vector processing, texture processing, or another type of data structure). In one embodiment, the GPU 104 can include one or more GPUs and each of the GPUs can include one or more graphic processing cores. In another embodiment, the device includes system memory 118. In one embodiment, the system memory 118 is a memory accessible by the CPU 102 and/or GPU 104 and is used to store data for use by these processors. In one embodiment, the system memory 118 can be read-only memory (ROM), flash memory, dynamic random access memory (DRAM) such as synchronous DRAM (SDRAM), or another type of memory used to store data for the processors 102 and 104.

In one embodiment, the CPU(s) 102 includes a memory manager 112, CPU translation lookaside buffer (TLB) 114, and CPU TLB manager 124. In one embodiment, the memory manager 112 manages the virtual memory for processes being executed by the CPU(s) 102 and GPU(s) 104. Virtual memory is a scheme that gives a process an illusion of working with a large block of contiguous memory space (perhaps even larger than real memory), where the actual allocation of the virtual memory could be fragmented in physical memory and/or stored on persistent storage. Fixed-size blocks (pages) or variable-size blocks of the job are read into main memory as needed. In this embodiment, the memory manager 112 performs virtual address translations for a virtual memory address of a process and returns a physical address if the data referenced by the virtual memory address is stored in the system memory 118. If the data referenced by the virtual memory address is not stored in the system memory but instead is stored in the persistent storage 126, the memory manager 112 pages in the stored pages corresponding to this virtual memory address into the system memory 118.

In addition, the memory manager 112 manages the working set of the CPU(s) 102 and GPU(s) 104. In one embodiment, the working set of either processor is a set of pages that the processor is using (or not currently using). Each page is a variable or fixed length contiguous block of virtual memory. In this embodiment, virtual memory allows a page that does not currently reside in main memory to be addressed and used. If a process tries to access a location in such a page, an exception called a page fault is generated. The memory manager is notified and loads the required page from the persistent storage. The process addressing this virtual memory does not have knowledge of a page fault as the memory manager handles the paging for the process. In one embodiment, managing the working set is determining which of the pages resident in the system memory 118 should be kept resident or evicted to persistent storage 126. For example and in one embodiment, the memory manager 112 determines which pages for the CPU(s) 102 have not been used recently and selects one or more of these pages to page out to persistent storage 126.

In a further embodiment, the memory manager 112 maintains the TLB coherency of the different TLBs 114 and 116. In one embodiment, TLB coherency ensures that each TLB has consistent data. In one embodiment, a TLB is a cache local to a CPU or GPU that stores recently used virtual address translations. If a virtual memory address translation becomes invalid (e.g., the page corresponding to a virtual address is evicted from physical memory), the memory manager 112 signals to each TLB 114 and 116 via the respective TLB manager 124 and 122, respectively, to invalidate a TLB entry corresponding to this virtual memory address translation.

In another embodiment, the memory manager 112 handles the GPU page faulting mechanism, including pre-fetching stored pages that are relevant to the memory object the GPU is operating on. In this embodiment, the memory manager 112 detects a GPU page fault for a memory access by the GPU(s) 104. In this embodiment, the page fault can occur if the GPU(s) 104 accesses a virtual memory address that is associated with a page that is stored in persistent storage 126. The page fault mechanism allows the memory manager to retrieve that stored page form persistent storage 126 and bring this page into system memory 118. In addition, the memory manager 112 analyzes the memory object associated with the page fault and determines if there are additional pages that can be pre-fetched. In one embodiment, the memory manager 112 analyzes the contextual information of the memory object to determine which stored pages should be brought into system memory prior to the GPU 104 needing to access these pages. For example and in one embodiment, memory object is an array that is being sequentially accessed by GPU and creates a page accessing one of the array elements. The memory manager analyzes the domain information of the array to determine if one element that are going to accessed would cause a future page fault. For each of the elements that may cause a future page fault, the memory manager 112 pre-fetches stored pages and preemptively maps these stored pages. In another embodiment, the memory manager 112 analyzes the historical use of the pages for this memory object. By pre-fetching the stored pages, the memory manager 112 reduces the number of GPU page fault that are generated. GPU page faulting is further described in FIGS. 8A-C below.

In one embodiment, the device 100 includes one or more running processes 106. In this embodiment, each of the running processes 106 will have its own virtual memory address space. Each of the memory address spaces is mapped to the physical memory using a page table. For example and in one embodiment, process X will have address space X and process Y will have address space Y. In this example, each of these processes can have virtual memory addresses that are the same but refer to different physical addresses. For example and in one embodiment, each process X and Y may have virtual memory addresses 0x10000, where the virtual memory address 0x10000 for process X has physical memory address 0x12345 and the virtual memory address 0x10000 for process Y has physical memory address 0x34567. As anther example, a memory object for a process has memory address 110 and physical address 120.

In one embodiment, the device 100 includes shared pages tables 108. In this embodiment, the GPU 104 shares the page tables with the CPU(s). This allows the GPU 104 to address memory of an object the GPU 104 is accessing using the virtual memory addressing of the application of that object. If the GPU 104 can share the page tables, the memory occupied by the object in system memory does not need to be pinned and can be page out as needed by the memory manager 112. For example and in one embodiment, if there is a sparse image that has multiple hundreds of megabytes, the memory manager 112 can page out some or all of the memory that stores the sparse image. In one embodiment, the shared page table keep track of where the pages are located in physical memory.

In one embodiment, for a device 100 that uses virtual memory, each process allocates memory using an address space that corresponds to the process. For example and in one embodiment, a process uses malice to allocate memory for that process. In this example, the translation between the virtual memory address for the allocated memory and the physical address can be retrieved the page table and the virtual memory address of the allocated memory is returned to the process. As another example and in another embodiment, a process has process virtual memory 106 allocated for the process. Each process virtual memory 106 may be dispersed across different areas of physical memory, or may have been paged out to a backup storage (typically the hard disk). When a process requests access to the process virtual memory 106, the memory manager 112 maps the process virtual address 106 to the physical address where that memory is located. The shared page table 108 is where the memory manager 112 stores the mappings of a page to a physical address of the page. The memory manager uses this mapping and the parts of the virtual address to return the translation from the virtual address to the physical address. Each of these mappings is stored in as a Page Table Entry (PTE). A PTE can include a mapping between the page to the physical address of the page, a process ID, CPU reference bit, a GPU reference bit, and other information. The PTE for the shared page tables is further described in FIG. 4 below.

In order to speed up the virtual address translation, the device 100 can store a cache of recently used virtual address translations from the operating system's page table in the TLB (such as CPU TLB 114 and GPU 116). When a virtual address needs to be translated into a physical address, the TLB is searched first. If a match is found, the physical address is returned and memory access by the CPU 102 or GPU 104 can continue. However, if there is no match, the memory manager 112 looks up the address mapping in the shared page table to see whether a mapping exists. If mapping exists, the virtual address translation to the TLB. The CPU 102 or GPU 104 virtual address translation will find a TLB hit, and the memory access will continue.

With the CPU and GPU processors sharing page tables, each CPU and GPU will have its own TLB (e.g., CPU TLB 114 and CPU TLB 114). For the CPU TLB 114, the GPU 104 tracks different address spaces for the different processes that could be running on the different CPU 102 processors. Because there are different TLB in the device 100, the operating system needs to maintain a TLB coherency across the different TLB's. TLB coherency means that each TLB has the same mappings and settings for each page table entry as the other TLBs.

Figure 2:
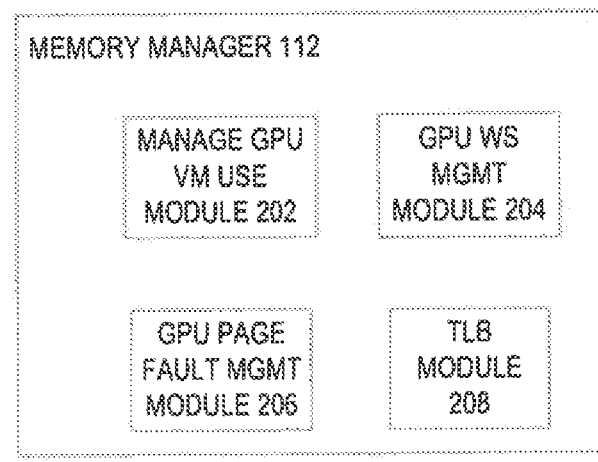
FIG. 2 is a block diagram of one embodiment of a memory manger.

FIG. 2 is a block diagram of one embodiment of a memory manger 112. In one embodiment, the memory manager 112 includes a manage GPU virtual memory use module 202, GPU working set management module 204, GPU page fault management module 206, and TLB module 208. In one embodiment, the manage GPU virtual memory use module 202 manages the GPU virtual memory by setting the GPU reference bit in the shared page tables as described in FIG. 5 below. The GPU working set management module 204 manages the GPU working set by periodically resetting the GPU reference bit in the shard pages tables and later determining which of the pages are candidates for eviction as described in FIGS. 6A-B below. The GPU page fault management module 206 handles a GPU page fault and pre-fetches stored pages as described in FIG. 7 below. The TLB module 208 maintains the TLB coherency as described in FIG. 8D below.

Figure 3:
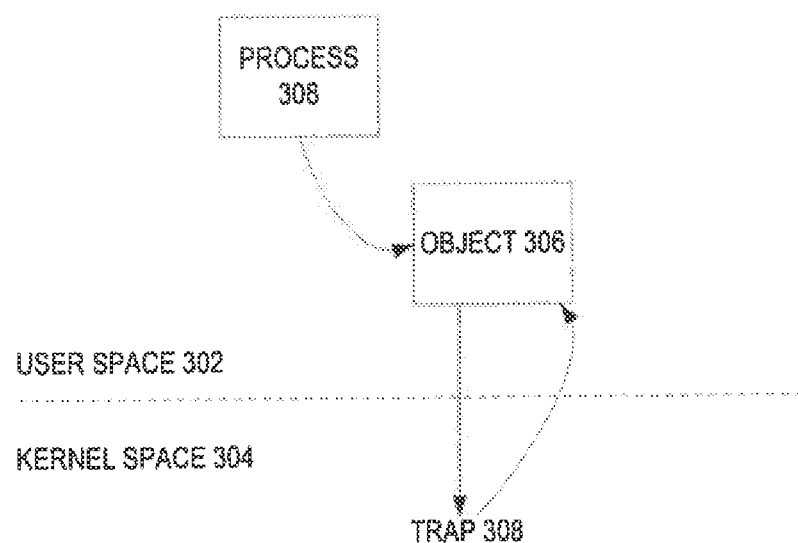
FIG. 3 is an illustration of one embodiment of a process accessing an object in memory.

FIG. 3 is an illustration of one embodiment of process 310 accessing an object 306 in memory. In one embodiment, the process 310 accesses the contents of the object 306 using the virtual memory address of the process. In this embodiment, the process 310 is executing in user space 302. In one embodiment, the user space 302 is user space is the memory area where user mode applications work and this memory can be evicted as necessary. If the object is stored in a page that is resident in persistent storage instead of the physical memory, the memory manager generates a page fault (or trap) 308 so that the memory manager can retrieve the stored page and store the page in physical memory, With the memory object 306 stored in a page in the physical memory, the process 310 can access the contents of the memory object 306.

Figure 4:
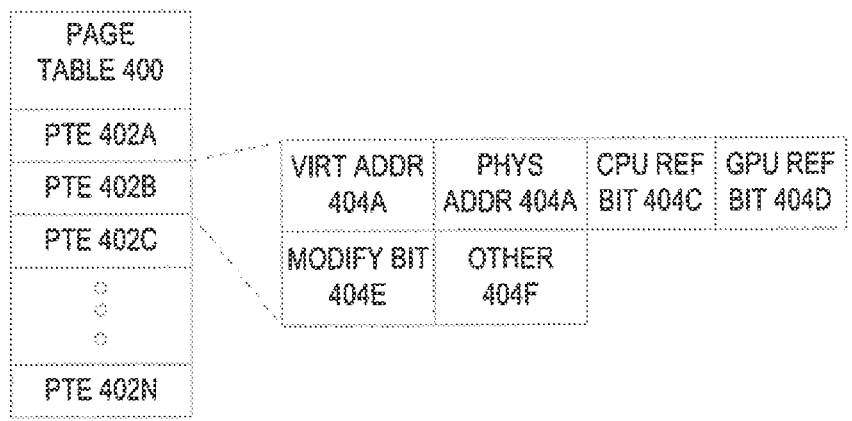
FIG. 4 is an illustration of one embodiment of a page table and a page table entry.

FIG. 4 is an illustration of one embodiment of a shared page table 400 and a page table entries (PTE) 402A-402N. In one embodiment, the shared page table 400 stores the mappings virtual addresses to physical addresses. In one embodiment, each of the PTEs 402A-402N include the fields virtual memory address 404A, physical address 404B, CPU reference bit 404C, and GPU reference bit 404D, modified bit 404E, and other fields 404F. In one embodiment, the virtual memory address 404A is the virtual memory address of a page that corresponds to the physical memory address for the page stored in the physical address field 404B. In one embodiment, physical address 404B is the physical address of the system memory for a page corresponding to the virtual address in the virtual address 404A field. In this embodiment, the virtual address 404A and physical address 404B fields are used for the virtual address translation. In one embodiment, the modified bit 404E indicates whether the pages associated with this virtual address translation has been modified, In one embodiment, the other field 404F are other Fields that can be part of the page table entry 402B. In one embodiment and in order to distinguish the overlapping virtual memory address spaces for different running processes, a process is associated with an address space identifier, which is in turn associated with an operating system process structure. In this embodiment, a separate page table and virtual address space exists for each process, though sub-trees of the page tables may be shared between processes.

In one embodiment, the PIE 402B further includes the CPU reference bit 404C and GPU reference bit 404D fields. In one embodiment, the CPU reference bit 404C is a bit set for the page table entry that signals that this memory has been accessed. A process that accesses the translation contained in the page table entry will set this bit 404C. The memory manager will use this bit 404C to determine if this memory has been recently used. For example and in one embodiment, memory that has not been recently used maybe paged out according to the operating system. The CPU reference bit 404C can be cleared periodically and re-checked to see which page table entries have been used during this time. For example, the operating system may clear the CPU reference bit 404C every five minutes so that the LRU algorithm can determine which virtual memory can be swapped out to desk in which memories should be left still in physical memory. In a further embodiment, each page table entry additionally includes a GPU reference bit 404D. The CPU reference bit 404D is similar to the CPU reference bit 404C in that the GPU reference bit 404D is set when the GPU accesses the page translation or accesses that virtual memory. By having a separate GPU and GPU reference bits, the operating system can do use different working set management strategies for CPU memory accesses and GPU memory accesses. In one embodiment, the other field 404F can include an execution bit that indicates the page includes program code. In this embodiment, the operating system would not evict a page that includes program code.

With this type of PTE 402B, the memory manger can use this stored information for is process of virtual memory addressing and whether memory pages can or cannot be evicted. In one embodiment, the memory manager can use a Least Recently Used (LRU) algorithm to determine whether to evict a memory page (or another type of memory management algorithm). In this embodiment, the LRU algorithm is a clock-like algorithm that is used to determine when memory pages should be swapped out to disk and when memory pages should be left resident in physical memory. In one embodiment, the virtual memory can use a file back system, which is a memory mapped to tile, or an anonymous system to swap memory to a swap file. The file back system is used for memory objects that are mapped to a the (e.g., images, video, audio, other graphics, or other type of object that is stored in a file). In an anonymous system, the memory manager pages allocated memory that is not mapped to a file to a persistent storage (e.g., swap file).

Because each page table entry 402A-N includes a separate GPU 404D and CPU reference bits 404C, the LRU algorithm can use different heuristics and priorities to manage the different page table entries. For example, the LRU algorithm can have different priorities and heuristics for page table entries that have a GPU reference bit set 404D and a different heuristic and priorities for each page table entry that have the CPU reference bit set 404C. Furthermore, the operating system can have a different set up heuristics and priorities if the page table entries had both the CPU and the GPU reference bit set (404C and 404D).

For example, the memory manager can affect a page table entry 402A-N based on the CPU reference bits 404C. Alternatively the operating system, can affect based on the GPUs access of graphics memory objects in the CPUs physical memory. The GPU access patterns for eviction can be a GPU specific algorithm, or can be a CPU+GPU specific heuristic. For example, for a graphics game, the graphics may have for trees in the front of a scene and a forest in the back of the scene. In this example, an object could be moving against this scene is one direction, thus affecting only parts of the scene. Under the old scheme, the entire graphics object in memory that that describes the forest and trees would be pinned in main memory creating memory pressure even though the object is moving in one direction and affecting just part of the scene. Using the GPU reference bit 404D, the memory manager can use memory pattern detection to determine which tiles of the graphics are being used and which are not. In this example, the parts of the graphic that are being used are stored in physical memory, while the other parts of the graphic that are not being used can be swapped out to swap file.

In another embodiment, the CPU working set management can be separate from the CPU working set management. One reason is that a memory manager may not want to evict a page based on a CPU pattern. For example, the operating system may want to prioritize GPU activity separately than the CPU activity working set activity. For example if a user runs the command "ls", the operating system does not inform the GPU for a CPU bound process. Another reason is that a GPU eviction scheme in a TLB shoot down maybe different than for a CPU eviction scheme. For example, if a memory location goes from a read/write status to a read-only status, the page table entry for that memory location is invalid. In a TLB shootdown, the operating system informs each CPU and GPU that this entry is invalid. As another example, a memory could be made read/write. In this example, the operating system needs to do a TLB shootdown for that entry for the CPU and GPU TLBs. In a TLB shoot down, the operating system invalidates the translation from the TLB. With a separate GPU reference bit in each page table entry, the GPU can have a separate GPU working set prioritization.

Figure 5:
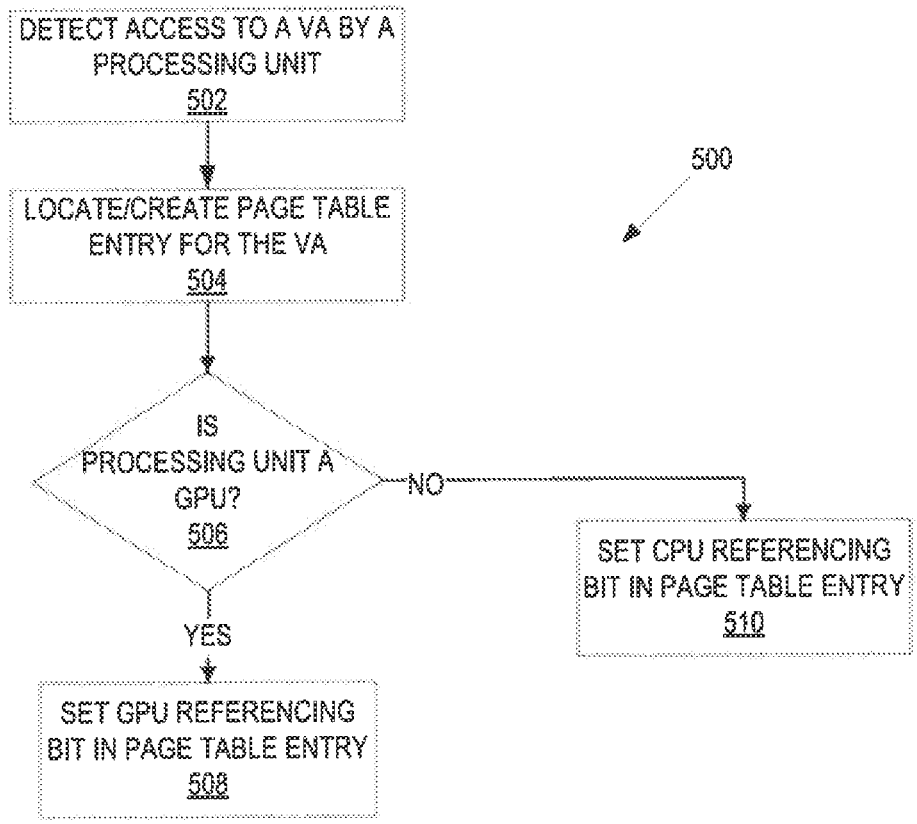
FIG. 5 is a flow diagram of one embodiment of a process to set a GPU reference bit for a CPU accessing virtual memory.

As described above, the device includes a shared page table with page table entries FIG. 5 is a flow diagram of one embodiment of a process 500 to set a GPU reference bit for a GPU accessing virtual memory. In one embodiment, process 500 is performed by the memory manager to set a GPU reference bit for a GPU access virtual memory, such as the memory manager 112 as described in FIG. 1, above. In one embodiment, process 500 begins by detecting access to a virtual memory address by a processing unit at block 502. In one embodiment, the processing unit can be a CPU or GPU. In one embodiment, the access of a virtual memory can be a read of the virtual memory address, a write of the virtual memory access, and/or an execution from a virtual address. At block 504, process 500 locates or creates the page table entry in the shared page table for the virtual memory address. In one embodiment, process 500 attempts to locate the page table entry for the virtual memory address by walking the page table. If process 500 cannot find a corresponding page table entry in the shared page table, process 500 loads a stored page that corresponds to the virtual. memory address into system memory.

At block 506, process 500 determines if the processing unit is a GPU. In one embodiment, process 500 determines if the access processing unit is a GPU based on an identifier of the processing unit performing the virtual memory access. In one embodiment, process 500 uses the processing unit type to determine whether to set a CPU or GPU reference bit for the page table entry. If the accessing processing unit is a GPU, at block 508, process 500 sets the GPU reference bit in the page table entry. If the accessing processing unit is a CPU, at block 510, process 500 sets the CPU reference bit in the page table entry.

Figure 6A:
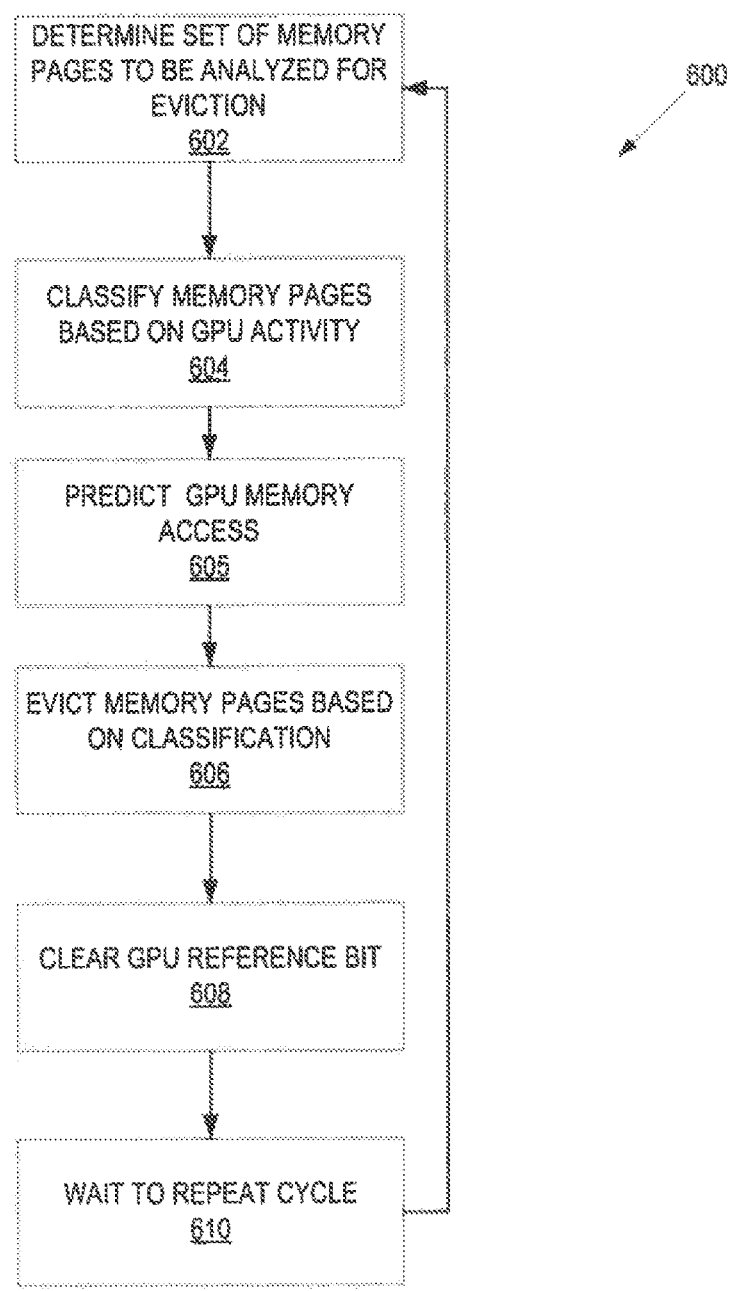
FIG. 6A is a flow diagram of one embodiment of a process to manage a GPU working set.

In FIG. 5, process 500 would set the GPU reference bit in a page table entry if a GPU accessed the virtual memory for that page table entry. In one embodiment, managing a GPU working set includes periodically analyzing a set of pages to determine if there is one or more of the pages can be evicted from physical memory and stored in persistent storage. FIG. 6A is a flow diagram of one embodiment of a process 600 to manage a GPU working set. In one embodiment, process 600 is performed by the memory manager to set a manage a set of GPU working set, such as the memory manager 112 as described in FIG. 1, above. Process 600 begins by determining a set of pages to be analyzed for eviction at block 602. In one embodiment, these set of pages can includes all of the currently allocated for use by the device, or a subset of the pages. At block 604, process 600 classifies the pages based on the GPU activity. In one embodiment, process 600 classifies each page based on whether the GPU reference is set. classifying the pages is further described in FIG. 7 below. Process 600 predicts a GPU memory access at block 605. In one embodiment, process 600 determines the type of memory object that is being processed and predicts the access pattern for this memory object. In this embodiment, process 600 can predict which parts of the memory object are kept in memory (and not evicted) and which parts of the memory object can be evicted. For example and in one embodiment, process 600 can be processing a texture that has tiles that are spatially close to each other. In this example, tiles that are spatially close to the current tile being processed would be kept in memory and tiles that are spatially remote from the current tile can be evicted.

Process 600 evicts one or more pages based on the classification at block 606. In one embodiment, process 600 randomly selects one or pages from the subset of pages with the lowest classification. For example and in one embodiment, if process 600 classifies each pages if these classifications; (i) GPU reference bit set, modified bit set; (ii) GPU reference bit set, modified bit not set; (iii) GPU reference bit not set, modified bit set; and (iv) GPU reference bit not set, modified bit not set. If the last classification (GPU reference bit not set, modified bit not set) is the lowest classification, process 600 evicts one or more pages from the subset of pages classified as GPU reference bit not set and modified bit not set. In one embodiment, process 600 randomly selects one or more pages from the lowest classification. classifying the pages of further described in FIG. 6B below.

At block 608, process 600 clears the GPU reference bit for each entry in the shared page tables. In one embodiment, process 600 clears the GPU reference bits after evicting one or more pages. In another embodiment, process 600 clears the GPU reference bits after waiting a time period or after multiple page evictions. In one embodiment, process 600 clears the GPU reference bit by setting the GPU reference bit to zero. In this embodiment, a cleared GPU reference bit indicates that this address has not been accessed by the GPU in the time period since the GPU reference bit has been cleared. Process 600 waits for a time period to repeat the cycle at block 610. In one embodiment, process 600 waits a predetermined time period (e.g., five minutes or some other fixed time period). In another embodiment, the time period is dynamic (e.g., if there is more GPU VM access activity, the time period is shorter and if there is relatively less GPU VM activity, the time period is longer). In one embodiment, after waiting the time period, process 600 repeats the cycle of blocks 602-608 described above.

Figure 6B:
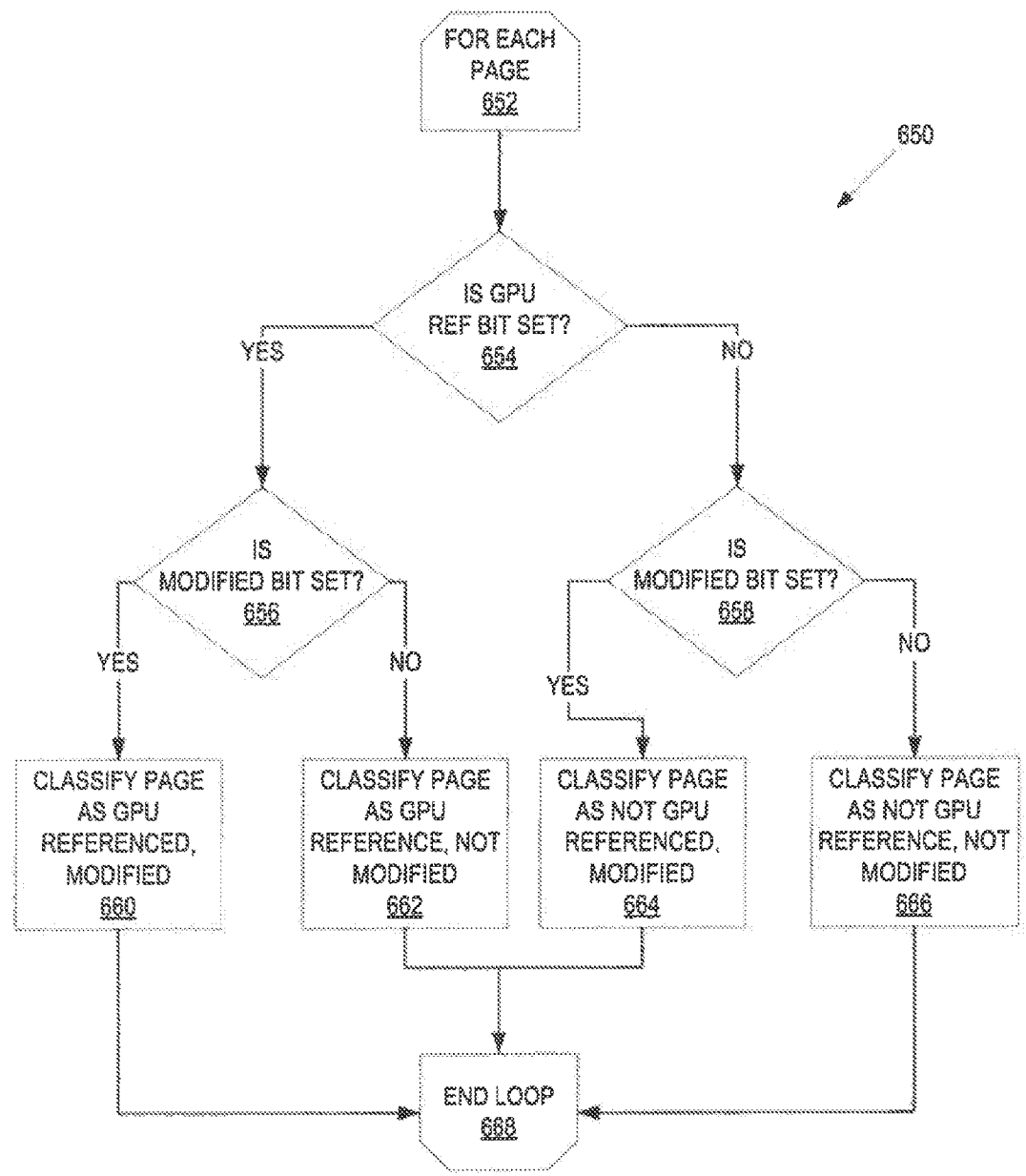
FIG. 6B is a flow diagram of one embodiment of a process to classify pages according to the GPU reference bit.

FIG. 6B is a flow diagram of one embodiment of a process 650 to classify a set of pages according to the GPU reference bit. In one embodiment, a process performs process 650 to classify the set of pages, such as process 600 above. Process 650 beings by performing a processing loop (blocks 652-668) to classify each of the set of pages. At block 654, process 650 determines if the GPU reference bit of this page is set. If the GPU reference bit is set for this page, execution proceeds to block 656 below. If the GPU reference bit is not set for this page, execution proceeds to block 658 below.

At block 656, process 650 determines if the modified bit is set for this page. If the modified bit is set, process 650 classifies this page as GPU referenced and modified. If the modified bit is not set, process 650 classifies this page as GPU referenced and not modified. Execution proceeds to block 668 where the processing loop ends. At block 658, process 650 determines if the modified bit is set for this page. If the modified bit is set, process 650 classifies this page as not GPU referenced and modified. If the modified bit is not set, process 650 classifies this page as not GPU referenced and not modified. Execution proceeds to block 668 where the processing loop ends. At the end of this loop, process 650 has classified the input set or pages into four different classifications. In one embodiment, this classified set of pages can be used for page eviction as described in FIG. 6 above.

Figure 7:
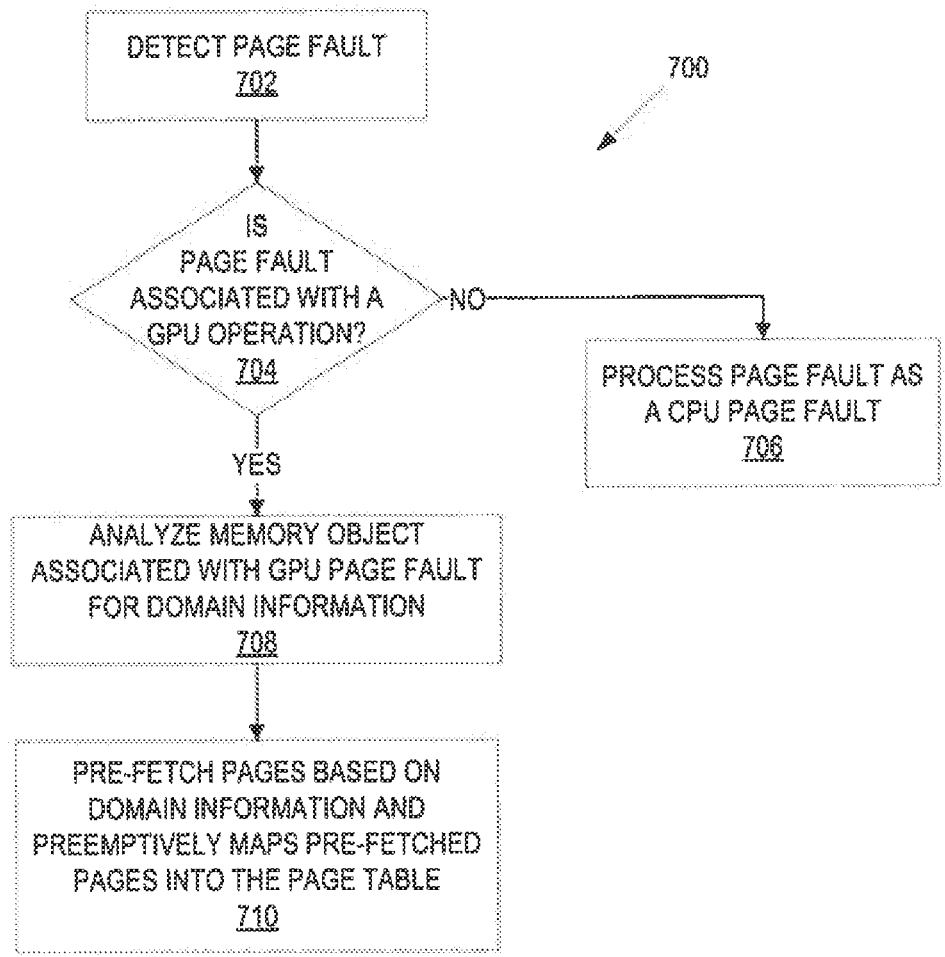
FIG. 7 is a flow diagram of one embodiment of a process to manage GPU page faults.

FIG. 7 is a flow diagram of one embodiment of a process 700 to manage GPU page faults. In one embodiment, process 700 is performed by the memory manager to set a manage a set of GPU page faults, such as the memory manager 112 as described in FIG. 1, above. Process 700 begins by detecting a page fault from a processing unit virtual memory access at block 702. In one embodiment, a page fault occurs if the virtual memory that a CPU or a GPU is attempting to access is mapped to a page that is stored on persistent storage. In this embodiment, the page fault mechanism allows process to retrieve that stored page from persistent storage and bring this page into system memory. In one embodiment, each page fault degrades a device performance because execution of a process is interrupted during a page fault. In one embodiment, process 700 detects the page fault by having a device component (e.g., the CPU or GPU) send a message to process 700 that a page fault has occurred.

At block 704, process 700 determines if the page fault is associated with a GPU operation. In one embodiment, process 700 determines if the page fault is associated with a GPU operation by determining which device component has sent the message alerting the page fault, If the GPU alerts the page fault, process 700 determines that the page fault is a GPU page fault. If the page fault is not associated with a GPU, process 700 processes the page fault as a CPU page fault at block 706. If the page fault is associated with a GPU operation, at block 708, process 700 analyzes the memory object associated with the page fault for domain information. In one embodiment, the page fault can occur because a GPU attempts to read from or write to a virtual address of a memory object that is stored a page in persistent storage. In this embodiment, process 700 can identify this memory object and analyze this memory object for domain information. In one embodiment, the domain information is information regarding the spatial arrangement of the memory object. For example and in one embodiment, a memory object can be an array, an image, a texture, or another type memory object. For example and in one embodiment, if the memory object is an array and the page fault is associated with a virtual memory access of the $i^{th}$ element of the array. In this example, the array is a one-dimensional data structure with a random-access index. In another embodiment, the memory object is a texture that is composed of tiles (e.g., Wang tiling or non-periodic tiling). In this embodiment, the domain information is spatial arrangement of the tiles in the texture and can also include a metric that is used to determine the spatial distance between different tiles. In another embodiment, process 700 analyzes the historical access of the memory object to determine an access pattern of the memory object. For example and in one embodiment, if a process executing case GPU is performing an iterative access to the elements of the memory object, a future access pattern would be a element by element sequential access.

Based on the domain and historical information, process 700 pre-fetches pages stored in persistent storage for pre-dicted memory object predicted accesses and brings these stored pages into system memory at block 710. In addition, process 700 preemptively maps the pre-fetched pages into the page table. In one embodiment, preemptively mapping is adding an entry in the shared page table for each page that is pre-fetched. By preemptively mapping the pre-fetched pages into the page table, process 700 reduces the future chance of a page fault for a future access and improves device performance. For example and in one embodiment, if process 700 predicts that a page fault for the $i^{th}$ element would lead to accesses to the $i^{th}+1, \ldots, i^{th}+n$ elements, process 700 could pre-fetch pages corresponding to these elements and preemptively maps these fetched pages in the page table. By performing the pre-fetch and preemptive mapping, process 700 reduces and/or eliminates the occurrence of a page fault for an access to the $i^{th}+1, \ldots, i^{th}+n$ elements. In another example and embodiment, if process 700 could analyze a texture to determine which tiles of the texture that are close to an $i^{th}$ tile of this texture. Using this information, process 700 could pre-fetch those pages for tiles that are close to the $i^{th}$ tile.

Figure 8A:
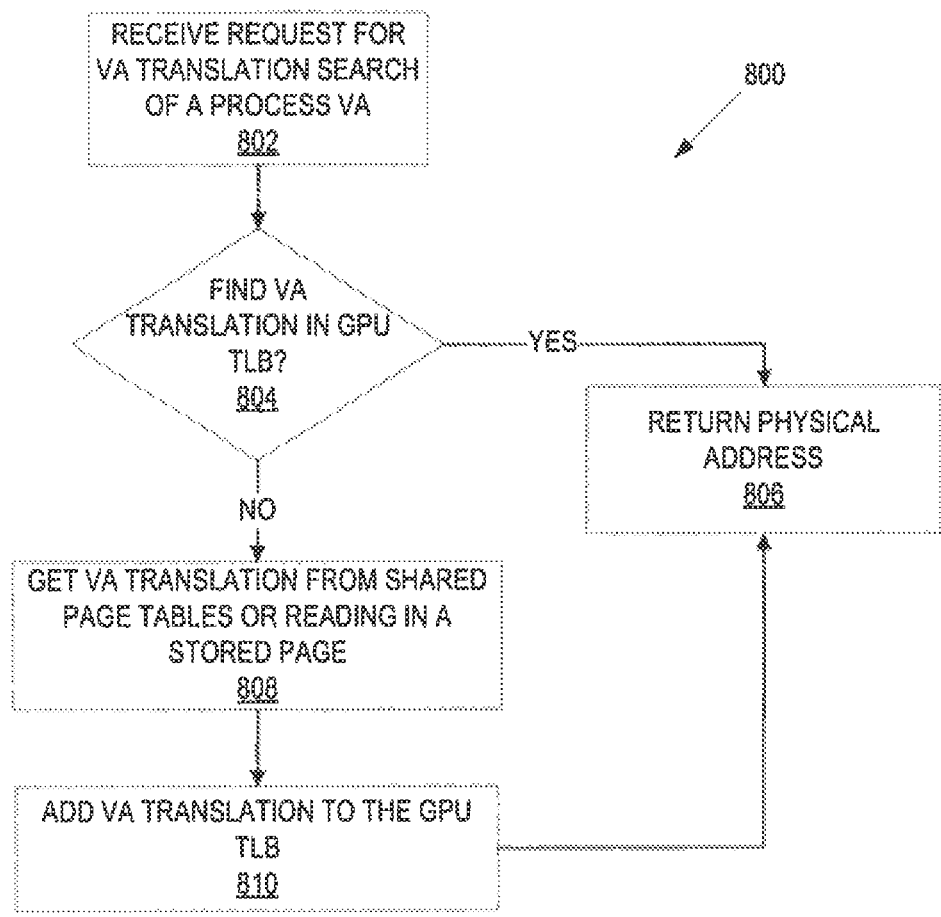
FIG. 8A is a flow diagram of one embodiment of a process to process a virtual memory address translation using a GPU TLB.

As described above, the GPU includes a TLB that is used to cache recently used virtual address translations. The GPU populates the TLB with recently used virtual address translations and searches the TLB when the GPU accesses virtual memory. In addition, the memory manager maintains the TLB coherency among the different GPU and CPU TLBs detecting invalid virtual address translations and sending requests to delete these invalid translations to the GPU and/or CPUs so that the different TLB have coherent translation data. FIG. 8A is a flow diagram of one embodiment of a process 800 to process a virtual memory address translation using a GPU TLB. In one embodiment, process 800 is performed by the GPU TLB manager to process a virtual memory address translation using a GPU TLB, such as the GPU TLB manager 122 as described in FIG. 1, above. Process 800 begins by receiving a request for a virtual address translation search of a process virtual memory at block 802. In one embodiment, process 800 receives this request as a result of a process being executed by a GPU accessing a virtual memory address (e.g., an access to read contents stored in a virtual memory address or an access to write to the virtual memory address). At block 804, process 800 searches the GPU TLB for the virtual address translation. In one embodiment, process 800 walks the TLB searching for the translation. In another embodiment, the GPU TLB is content addressable memory and process 800 uses the virtual address to search the GPU TLB using the content addressable memory. If the virtual address translation is found in the GPU TLB, process 800 returns the physical address at block 806.

If the virtual address translation is not found in the GPU TLB, at block 808, process 800 gets the virtual address translation from the shared page tables or by the stored page that corresponds to the virtual address. In one embodiment, process 800 makes a request for the virtual address translation to the memory manager. In this embodiment, the memory manger receives the requests and walks the shared page table to search for the virtual address translation. If the virtual address translation is found, the memory manger returns the physical address to process 800. If the virtual address translation is not found, the memory manger brings in the stored page corresponding to requested virtual memory and loads the stored page into system memory. With the page stored in system memory, the memory manage returns the physical address to process 800. Using the returned physical address, process 800 adds the virtual address translation to the GPU TLB at block 810.

Figure 8B:
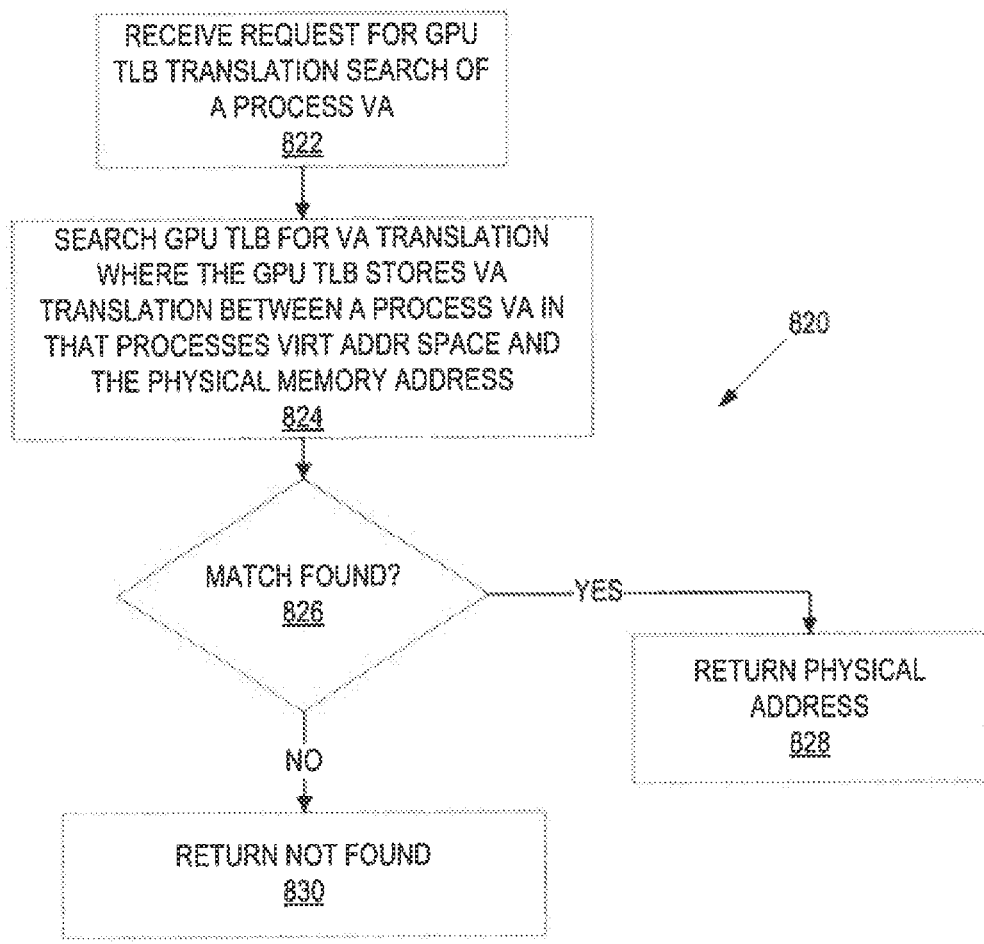
FIG. 8B is a flow diagram of one embodiment of a process to search for a virtual memory entry in a GPU TLB.

As described above, process 800 searches the GPU TLB for a requested virtual address translation. FIG. 8B is a flow diagram of one embodiment of a process 820 to search for a virtual memory entry in a GPU TLB. In one embodiment, process 820 is performed by process that handles a virtual address translation using a GPU TLB, such as process 800 described above in FIG. 8, block 804. Process 820 begins by receiving a request for a GPU TLB translation search for a process virtual memory address at block 822. At block 824, process 820 searches the GPU TLB for the virtual address translation, In one embodiment, the GPU TLB is content-addressable memory (CAM). In this embodiment, process 820 uses the virtual address as the CAM search key and the search result is a physical address. If the requested address is present in the TLB, the CAM search yields a match and the retrieved physical address can be used to access memory. Process 820 determines if a match is found at block 826. If no match is found, process 820 returns that the match is not found at block 830. If a match is found, process 820 returns the physical address at block 828.

Figure 8C:
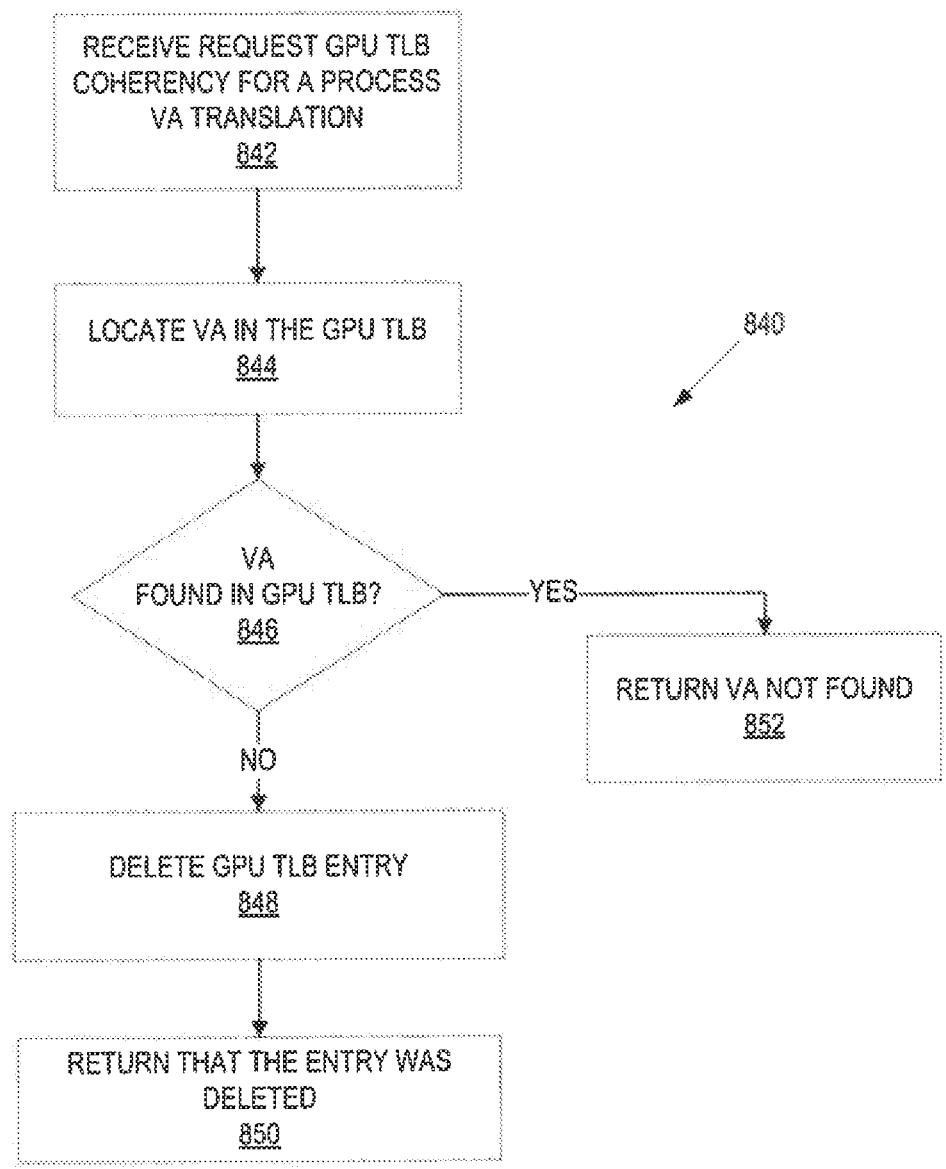
FIG. 8C is a flow diagram of one embodiment of a process to manage TLB coherency requests.

FIG. 8C is a flow diagram of one embodiment of a process 840 to manage TLB coherency requests. In one embodiment, process 800 is performed by the GPU TLB manager to manage translation lookaside buffer coherency, such as the GPU TLB manager 122 as described in FIG. 1, above. Process 840 begins by receiving a request for GPU TLB coherency for a process virtual memory translation at block 842. In one embodiment, process 840 receives this request from the memory manager as a result of the memory manager determining that one of the virtual address translations is no longer valid. In one embodiment, virtual address translations can be become invalid if the page corresponding to the virtual address is paged out and stored in persistent storage. In another embodiment, pages that are involved with a TLB coherency request have the corresponding virtual addressed invalidated. In this embodiment, if a page is freed up, process 840 keeps track by not synchronizing this page and avoids repurposing that page.

At block 844, process 840 locates the virtual address in the GPU TLB. In one embodiment, process 840 searches the GPU TLB by using the content addressable memory of the TLB. Process 840 determines if the virtual address translation is found at block 844,. If the virtual address translation is not found, at block 846, process 840 returns that the virtual address translation was not found. If the virtual address translation was found, process deletes the GPU TLB entry at block 848. At block 850, process 840 returns that the GPU TLB entry was deleted.

Figure 8D:
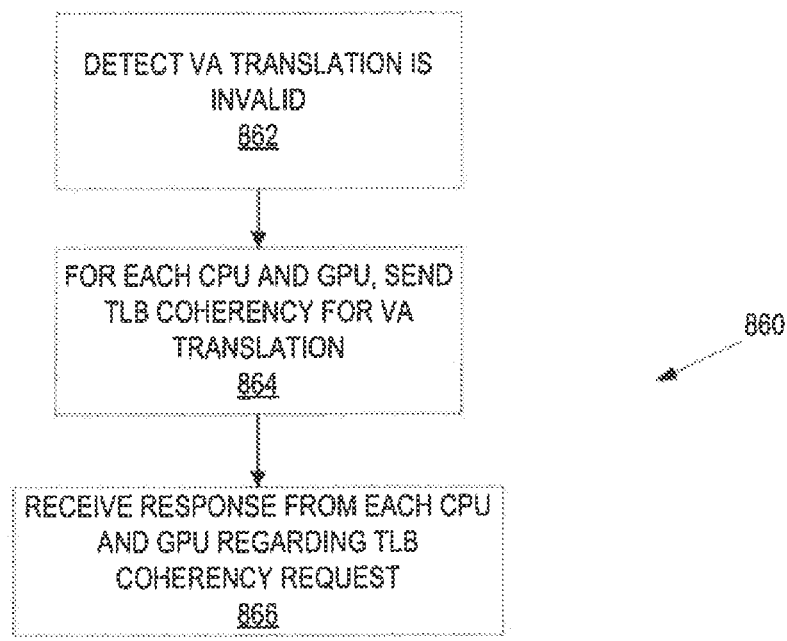
FIG. 8D is a flow diagram of one embodiment of a process to manage TLB coherency in a mixed CPU/GPU architecture.

FIG. 8D is a flow diagram of one embodiment of a process 860 to manage TLB coherency in a mixed CPU/GPU architecture. In one embodiment, process 860 is performed by the memory manager to manage TLB coherency in a mixed CPU/GPU architecture, such as the memory manager 112 as described in FIG. 1, above. Process 860 begins by detecting an invalid virtual address translation at block 862. In one embodiment, an invalid virtual address translation is a virtual address translation for a virtual address that corresponds to a page that is stored in persistent storage. In one embodiment, this can occur if the page that contains the physical address is evicted and stored in persistent storage. In this embodiment, when a page is evicted and stored on persistent storage, the physical addresses that use to correspond to this page are freed to be allocated for different virtual addresses for the same or different processes. For example and in one embodiment, if a virtual address 0x1000 is translated to page X for physical address 0x123456, and page X is evicted and stored on persistent storage, the physical address 0x123456 is freed and can be used by the memory manager for another virtual address. Thus, because the physical address 0x123456 is available for other virtual addresses, the content for this address can change and the virtual address translation is invalid. In another embodiment, pages that are involved with a TLB coherency request have the corresponding virtual addresses invalidated. In this embodiment, if a page is freed up, this page is not synchronized is not repurposed until the TLB coherency completes.

When a translation becomes invalid, the TLB entries for the CPU and CPU TLB needs to deleted so that this invalid translation is not used the CPU and/or GPU. At block 864, process 860 sends a TLB coherency request for the virtual address translation to each CPU and GPU. In one embodiment, process 860 sends a TLB coherency request for the virtual address translation to a subset of CPU and GPUs. In one embodiment, the TLB coherency request is a request to the CPU or GPU to delete the virtual address translation from processing unit's respective TLB so that this processing unit does not use the invalid virtual address translation. At block 866, process 860 receives a response from each CPU and GPU regarding the TLB request. In one embodiment, process 860 waits for each TLB request to complete because process 860 will refrain from repurposing those pages associated with the TLB request. In one embodiment, after receiving a response from each of CPU and/or GPUs that were sent TLB coherency requests, process 866 ends.

Figure 9:
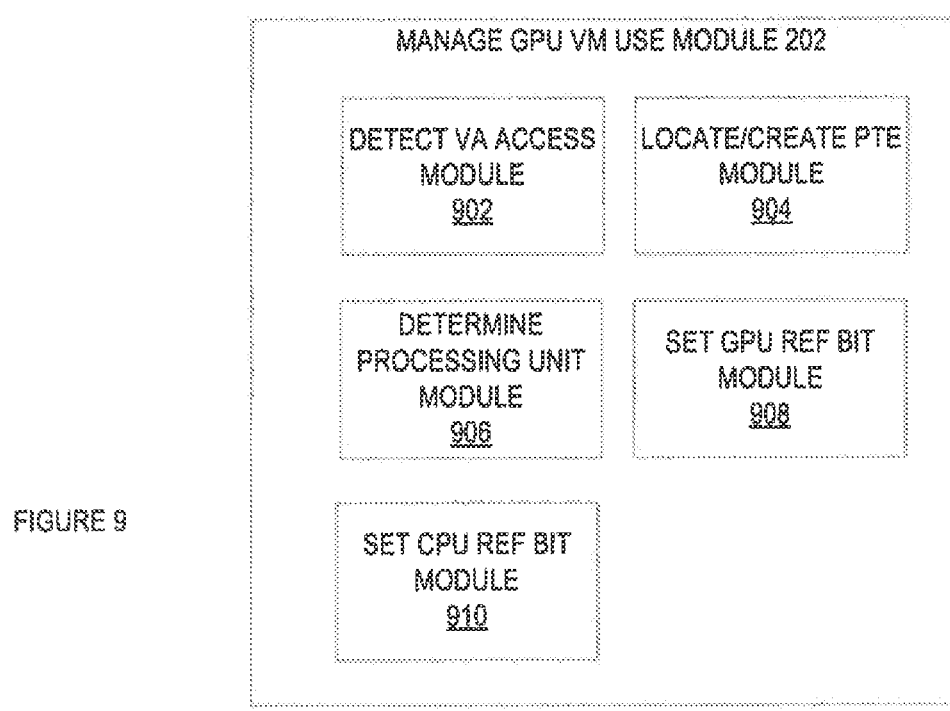
FIG. 9 is a block diagram of one embodiment of a manage GPU virtual memory use module to set a GPU reference bit for a GPU accessing virtual memory.

FIG. 9 is a block diagram of one embodiment of a manage GPU virtual memory use module 202 to set a GPU reference bit for a GPU accessing virtual memory. In one embodiment, the manage GPU virtual memory use module 202 includes detect virtual memory access module 902, locate/create PTE module 904, determine processing unit module 906, set GPU reference bit module 908, and set CPU reference bit module 910. In one embodiment, the detect virtual memory access module 902 detects a virtual address access as described in FIG. 5, block 502 above. The locate/create PTE module 904 locates or creates the page table entry as described in FIG. 5, block 504 above. The determine processing unit module 906 determines the type of processing unit as described in FIG. 5, block 506 above. The set GPU reference bit module 908 sets the GPU reference bit as described in FIG. 5, block 502 above. The set CPU reference bit module 910 sets the CPU reference bit as described in FIG. 5, block 502 above.

Figure 10A:
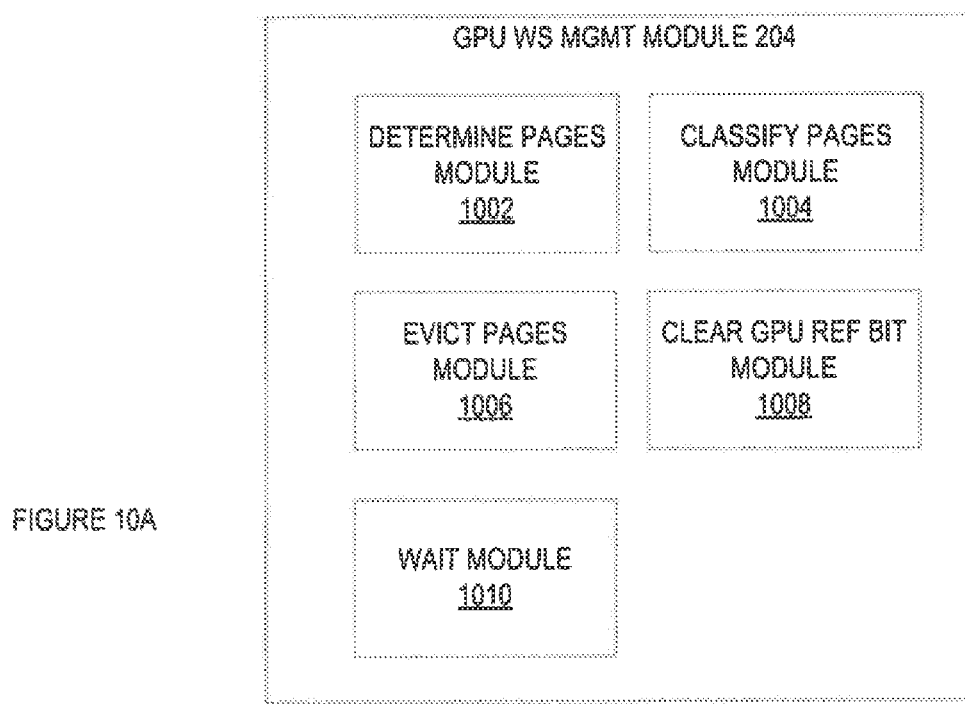
FIG. 10A is a block diagram of one embodiment of a GPU working set management module to manage a GPU working set.

FIG. 10A is a block diagram of one embodiment of a GPU working set management module 204 to manage a GPU working set. In one embodiment, the GPU working set management module 204 includes determine pages module 1002, classify pages module 1004, evict pages module 1006, clear GPU reference bit module 1008, and wait module 1010. In one embodiment, the determine pages module 1002 the set of pages to be analyzed for eviction as described in FIG. 6A, block 602 above. The classify pages module 1004 classifies the pages based on CPU activity as described in FIG. 6A, block 604 above. The evict pages module 1006 evicts one or more pages based on the classifications as described in FIG. 6A, block 606 above. The clear GPU reference bit module 1008 clears the GPU reference bit as described in FIG. 6A, block 608 above. The wait module 1010 waits to repeat the cycle as described in FIG. 6A, block 610 above.

Figure 10B:
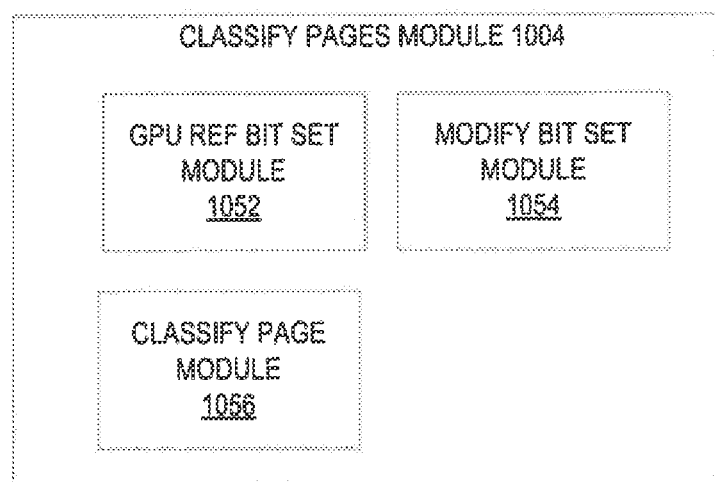
FIG. 10B is a block diagram alone embodiment ala classify pages module to classify pages according to the GPU reference bit.

FIG. 10B is a block diagram alone embodiment of a classify pages module 1004 to classify pages according to the GPU reference bit. In one embodiment, the classify pages module 1004 includes a GPU reference bit set module 1052, a modify bit set module 1054, and classify page module 1056. In one embodiment, the GPU reference bit set module 1052 determines if a GPU reference bit was set as described in FIG. 6B, block 654. The modify bit set module 1054 determines if the modify bit was set as described in FIG. 6B, blocks 656 and 658. The classify page module 1056 classifies a page based on the setting of the GPU reference and modify bits as described in FIG. 6B, blocks 660, 662, 664, and 666.

Figure 11:
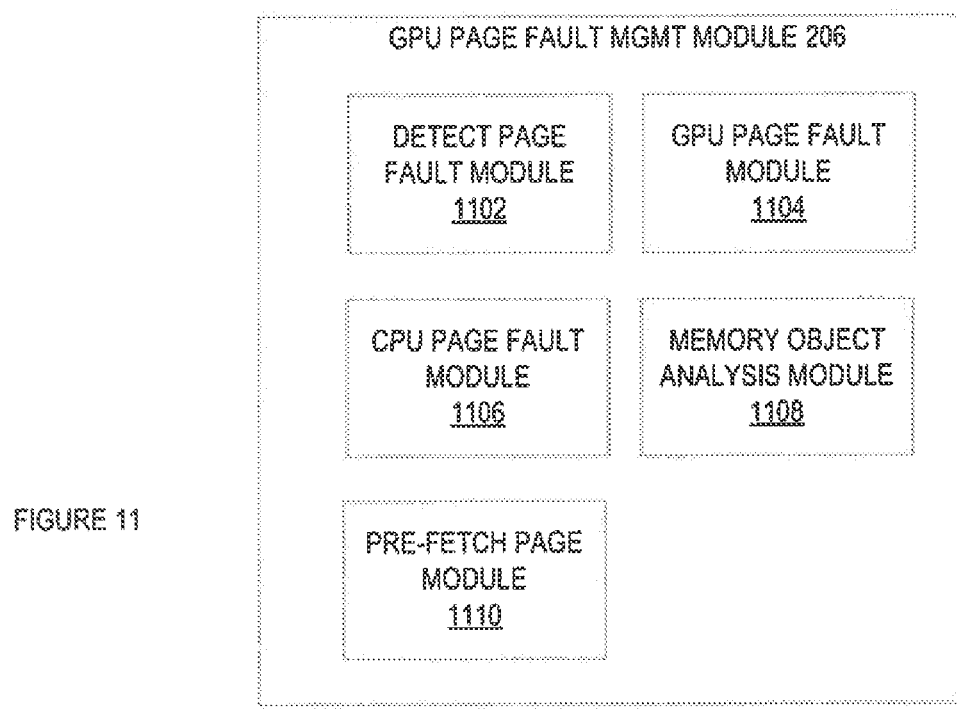
FIG. 11 is a block diagram of one embodiment of a GPU page fault management module to manage GPU page faults.

FIG. 11 is a block diagram of one embodiment of a GPU page fault management module 206 to manage GPU page faults. In one embodiment, the GPU page fault management module 206 includes a detect page fault module 1102, GPU page fault module 1104, CPU page fault module 1106, memory object analysis module 1108, and pre-fetch page module 1110. In one embodiment, the detect page fault module 1102 detects a page fault as described in FIG. 7, block 702 above. The GPU page fault module 1104 determines if the page fault is associated with a GPU operation as described in FIG. 7, block 704 above. The CPU page fault module 1106 processes the page fault as a CPU page fault as described in FIG. 7, block 706 above. The memory object analysis module 1108 analyzes the memory object as described in FIG. 7, block 708 above. The pre-fetch page module 1110 pre-fetches one or more pages based on the analysis as described in FIG. 7, block 710 above.

Figure 12A:
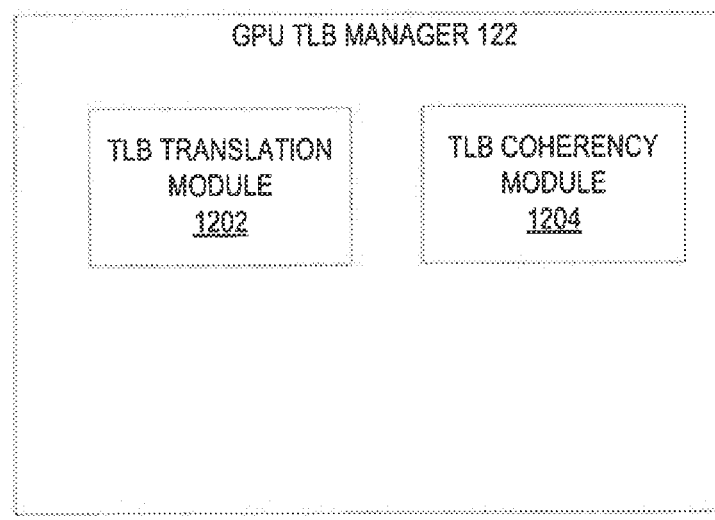
FIG. 12A is a block diagram of one embodiment of a GPU TLB manager to manage a translation lookaside buffer in a mixed CPU/GPU architecture.

FIG. 12A is a block diagram of one embodiment of a GPU TLB manager 122 to manage a GPU TLB in a mixed CPU/GPU architecture. In one embodiment, the GPU TLB manager 122 includes a TLB translation module 1202 and TLB coherency module 1204. In one embodiment, the TLB translation module 1202 processes a virtual address translation as described in FIG. 8A above. The TLB coherency module 1204 manages TLB coherency as described in FIG. 8C above.

Figure 12B:
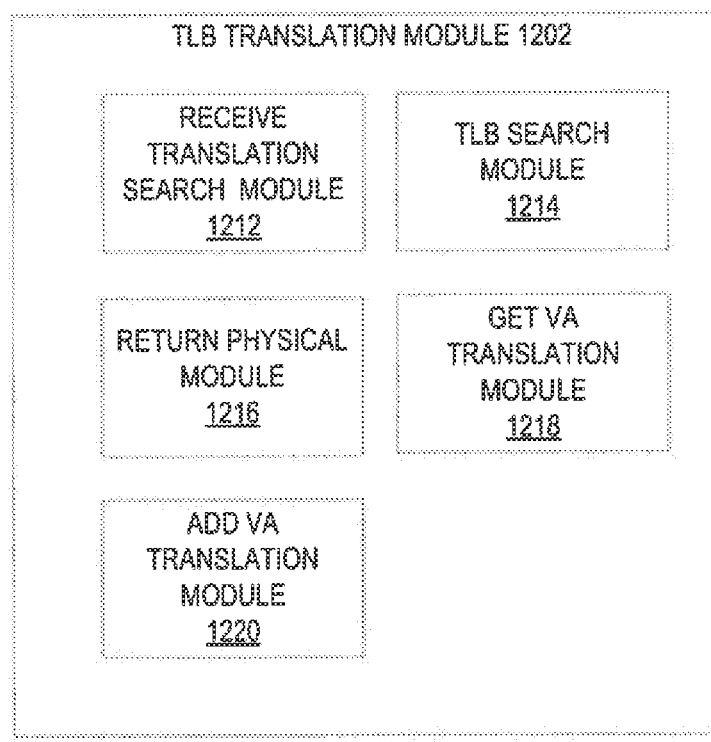
FIG. 12B is a block diagram of one embodiment of a TLB translation module to process a virtual memory address translation using a GPU TLB.

FIG. 12B is a block diagram of one embodiment of a TLB translation module 1202 to process a virtual memory address translation using a GPU TLB. In one embodiment, the TLB translation module 1202 includes a receive translation search module 1212, TLB search module 1214, return physical address module 1216, get virtual address translation module 1218, and add virtual address translation 1220. In one embodiment, the receive translation search module 1212 receives the translation search request as described in FIG. 8A, block 802 above. The TLB search module 1214 searches the TLB for the virtual address translation as described in FIG. 8A, block 804 above. The return physical address module 1216 returns the physical address as described in FIG. 8A, block 806 above. The get virtual address translation module 1218 gets the virtual address translation as described in FIG. 8A, block 808 above. The add virtual address translation 1220 adds the virtual address translation to the TLB as described in FIG. 8A, block 810 above.

Figure 12C:
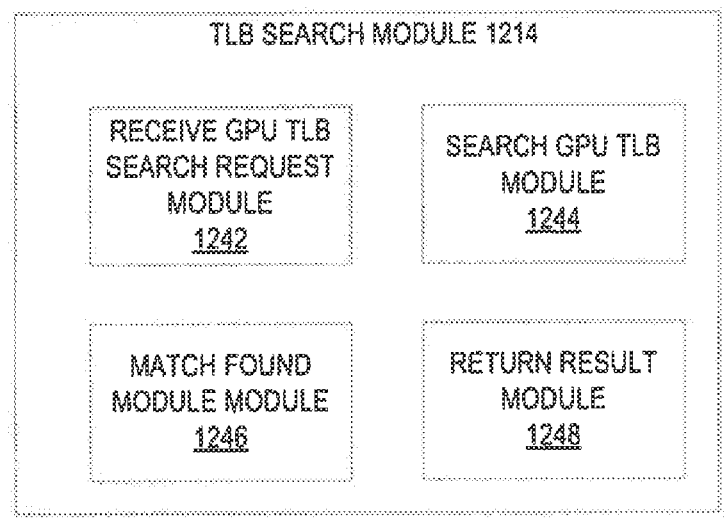
FIG. 12C is a block diagram alone embodiment of a TLB search module to search for a virtual memory entry in a GPU TLB.

FIG. 12C is a block diagram of one embodiment of a TLB search module to search for a virtual memory entry in a GPU TLB. In one embodiment, the TLB search module 1214 includes receive GPU TLB search request module 1242, search GPU TLB module 1244, match found module 1246, and return result module 1248. In one embodiment, the receive GPU TLB search request module 1242 receives the virtual address translation search request as described in FIG. 8B, block 822 above. The search GPU TLB module 1244 searches the GPU TLB for a match as described in FIG. 8B, block 824 above. The match found module 1246 determines if a match is found as described in FIG. 88, block 826 above. The return result module 1248 returns the results as described in FIG. 88, blocks 828 and 830 above.

Figure 12D:
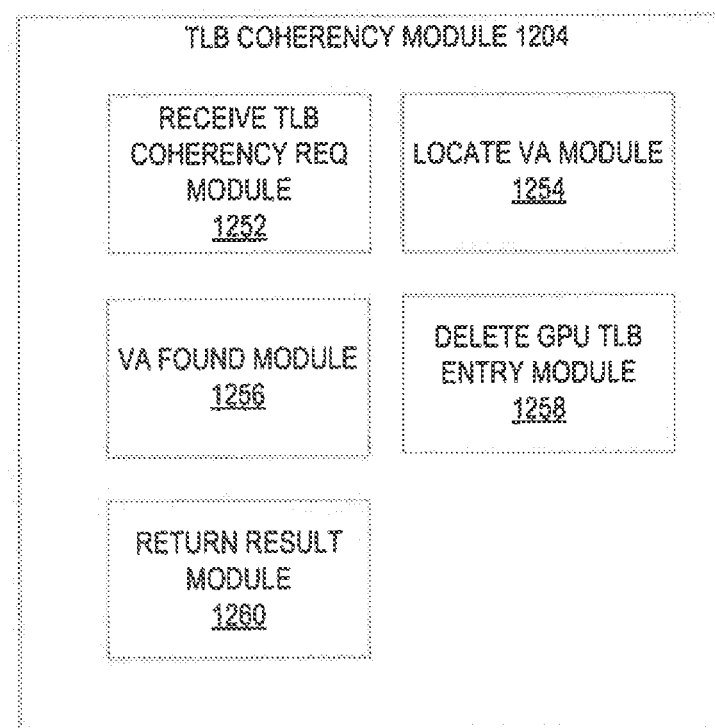
FIG. 12D is a block diagram of one embodiment of a TLB coherency module to manage TLB coherency requests.

FIG. 12D is a block diagram of one embodiment of a TLB coherency module 1204 to manage TLB coherency requests. In one embodiment, the TLB coherency module 1204 includes a receive TLB coherency request 1252, locate virtual address module 1254, virtual address found module 1256, delete GPU TLB entry module 1258, and return result module 1260. In one embodiment, the receive TLB coherency request 1252 receives the TLB coherency request as described in FIG. 8C, block 842 above. The locate virtual address module 1254 locates the virtual address as described in FIG. 8C, block 844 above. The virtual address found module 1256 determines if the virtual address is found as described in FIG. 8C, block 846 above. The delete GPU TLB entry module 1258 deletes the TLB entry as described in FIG. 8C, block 848 above. The return result module 1260 returns the result as described in FIG. 8C, blocks 850 and 852 above.

Figure 12E:
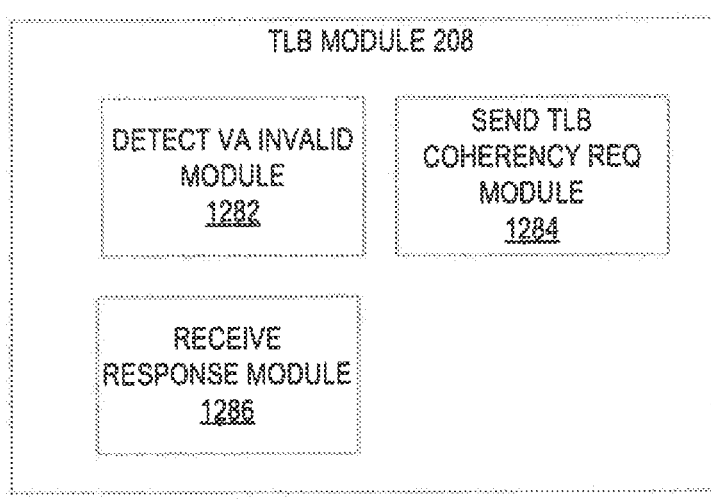
FIG. 12E is a block diagram of one embodiment of a TLB module to manage TLB coherency in a mixed CPU/GPU architecture.

FIG. 12E is a block diagram of one embodiment of as TLB module 208 to manage TLB coherency in a mixed CPU/GPU architecture. In one embodiment, the TLB module 208 includes a detect invalid virtual address module 1282, send TLB coherency request module 1284, and receive response module 1286. In one embodiment, the detect invalid virtual address module 1282 detects invalid virtual address translations as described in FIG. 8D, block 862 above. The send TLB coherency request module 1284 as described in FIG. 8D, block 862 above. The receive response module 1286 as described in FIG. 8D, block 862 above.

Figure 13:
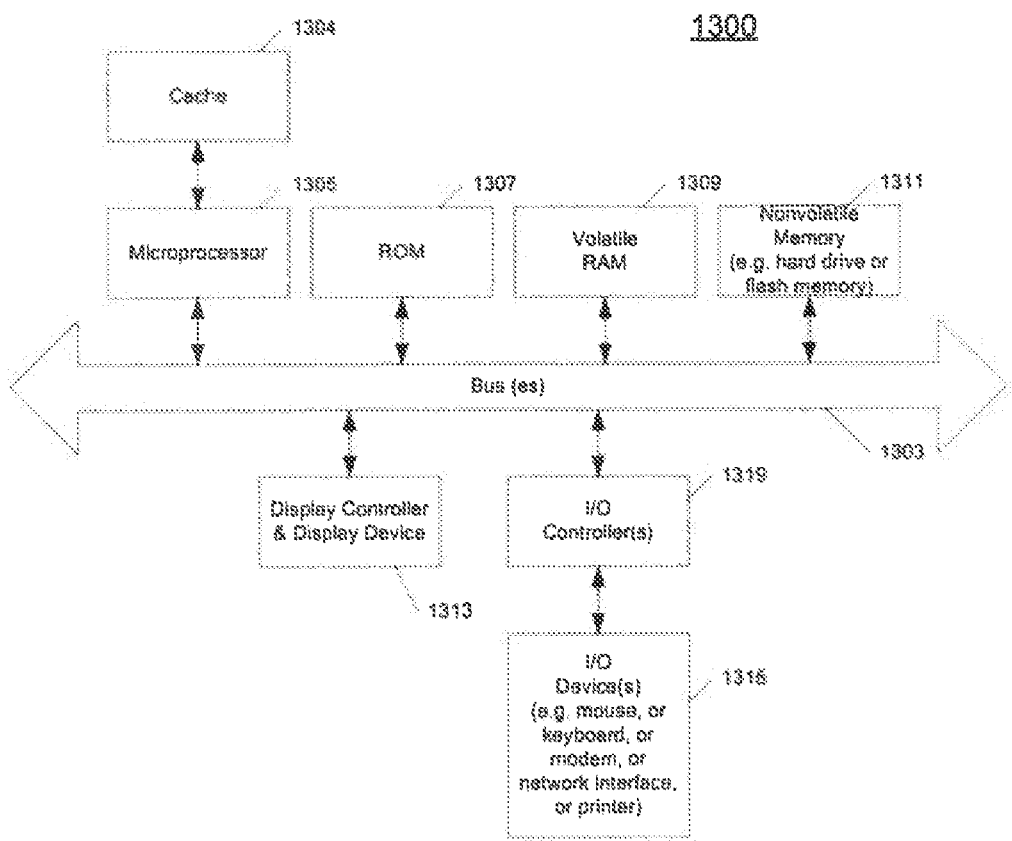
FIG. 13 illustrates one example of a typical computer system, which may be used in conjunction with the embodiments described herein.

FIG. 13 shows one example of a data processing system 1300, which may be used with one embodiment of the present invention. For example, the system 1300 may be implemented including a device 100 as shown in FIG. 1. Note that while FIG. 13 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 13, the computer system 1300, which is a form of a data processing system, includes a bus 1303 which is coupled to a microprocessor(s) 1305 and a ROM (Read Only Memory) 1307 and volatile RAM 1309 and a non-volatile memory 1311. The microprocessor 1305 may retrieve the instructions from the memories 1307, 1309, 1311 and execute the instructions to perform operations described above. The bus 1303 interconnects these various components together and also interconnects these components 1305, 1307, 1309, and 1311 to a display controller and display device 1313 and to peripheral devices such as input/output (I/O) devices which may be mice, keyboards, modems, network interfaces, printers and other devices which are well known in the art. Typically, the input/output devices 1315 are coupled to the system through input/output controllers 1313. The volatile RAM (Random Access Memory) 1309 is typically implemented as dynamic RAM (DRAM), which requires power continually in order to refresh or maintain the data in the memory.

The mass storage 1311 is typically a magnetic hard drive or a magnetic optical drive or an optical drive or a DVD ROM or a flash memory or other types of memory systems, which maintain data (e.g. large amounts of data) even after power is removed from the system. Typically, the mass storage 1311 will also be a random access memory although this is not required. While FIG. 13 shows that the mass storage 1311 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1303 may include one or more buses connected to each other through various bridges, controllers and/or adapters as is well known in the art.

Figure 14:
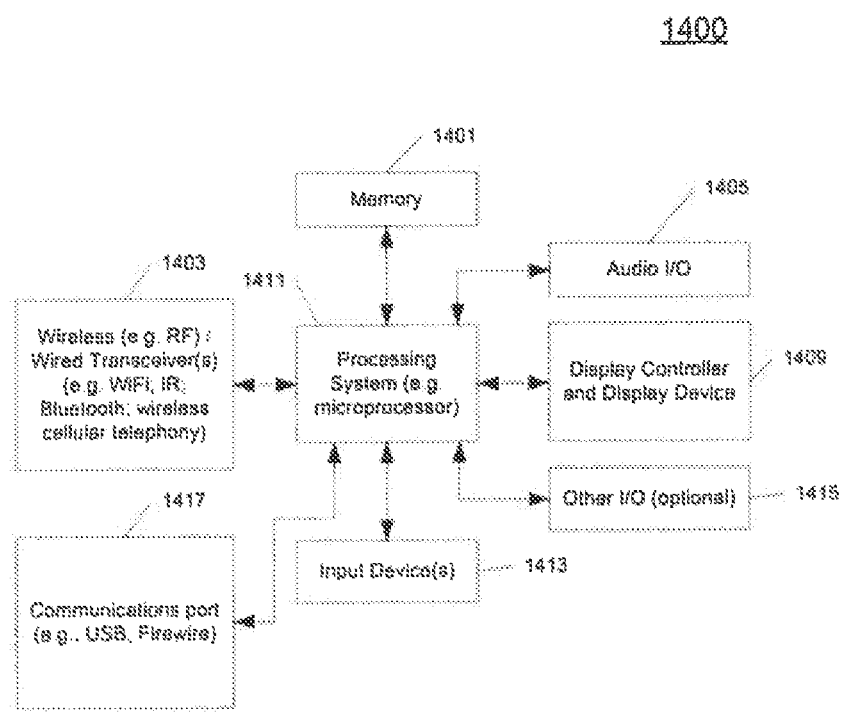
FIG. 14 shows an example of a data processing system, which may be used with one embodiment of the present invention.

FIG. 14 shows an example of another data processing system 1400 which may be used with one embodiment of the present invention. For example, system 1400 may be implemented as a device 100 as shown in FIG. 1. The data processing system 1400 shown in FIG. 14 includes a processing system 1411, which may be one or more microprocessors, or which may be a system on a chip integrated circuit, and the system also includes memory 1401 for storing data and programs for execution by the processing system. The system 1400 also includes an audio input/output subsystem 1405, which may include a microphone and a speaker for, for example, playing back music or providing telephone functionality through the speaker and microphone.

A display controller and display device 1409 provide a visual user interface for the user; this digital interface may include a graphical user interface which is similar to that shown on a Macintosh computer when running OS X operating system software, or Apple iPhone when running the iOS operating system, etc. The system 1400 also includes one or more wireless transceivers 1403 to communicate with another data processing system, such as the system 1400 of FIG. 14. A wireless transceiver may be a WLAN transceiver, an infrared transceiver, a Bluetooth transceiver, and/or a wireless cellular telephony transceiver. It will be appreciated that additional components, not shown, may also be part of the system 1400 in certain embodiments, and in certain embodiments fewer components than shown in FIG. 14 may also be used in a data processing system. The system 1400 further includes one or more communications ports 1417 to communicate with another data processing system, such as the system 1300 of FIG. 13. The communications port may be a USB port, Firewire port, Bluetooth interface, etc.

The data processing system 1400 also includes one or more input devices 1413, which are provided to allow a user to provide input to the system. These input devices may be a keypad or a keyboard or a touch panel or a multi touch panel. The data processing system 1400 also includes an optional input/output device 1415 which may be a connector for a dock. It will be appreciated that one or more buses, not shown, may be used to interconnect the various components as is well known in the art. The data processing system shown in FIG. 14 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1400 may be a network computer or an embedded processing device within another device, or other types of data processing systems, which have fewer components or perhaps more components than that shown in FIG. 14.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a, media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to any type of disk including floppy disks, optical disks, CD-ROMs, and magnetic.-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally fir reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "evaluating," "receiving," "determining," "computing," "sending," "modifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices, The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to manage a graphics processing unit working set of pages, the method comprising:
   determining the set of pages of a device to be analyzed, wherein the device includes a central processing unit and the graphics processing unit;
   classifying the set of pages based on at least a graphics processing unit reference bit and a modification bit associated with the set of pages into a set of at least four classes; and
   evicting a page of the set of pages from one of the set of at least four classes based on the classifying.

2. The non-transitory machine-readable medium of claim 1, further comprising:
   clearing the graphics processing unit reference bit from each page table entry associated with the set of pages.

3. The non-transitory machine-readable medium of claim 1, further comprising:
   waiting a time period before re-determining the set of pages to be analyzed.

4. The non-transitory machine-readable medium of claim 1, wherein each page in the set of pages is a contiguous block of virtual memory.

5. The non-transitory machine-readable medium of claim 1, wherein the classification of each page is based at least on if the graphics processing unit reference bit is set in a page table entry associated with that page.

6. The non-transitory machine-readable medium of claim 5, wherein the graphics processing unit reference bit for a page table entry indicates whether a graphics processing unit has accessed a virtual memory associated with the page table entry.

7. The non-transitory machine-readable medium of claim 5, wherein the classification of each page is based at least on if the modification bit is set in a page table entry associated with that page.

8. The non-transitory machine-readable medium of claim 1, wherein the eviction comprises:
   determining a subset of pages from the set of pages that have a common classification;
   randomly selecting one of the pages from the subset of pages; and
   evicting the selected page.

9. The non-transitory machine-readable medium of claim 1, wherein the evicting of a page comprises:
   storing contents of the page from physical memory to persistent storage.

10. A method to manage a graphics processing unit working set of pages, the method comprising:
    determining the set of pages of a device to be analyzed, wherein the device includes a central processing unit and the graphics processing unit;
    classifying the set of pages based on at least a graphics processing unit reference bit and a modification bit associated with the set of pages into a set of at least four classes; and
    evicting a page of the set of pages from one of the set of at least four classes based on the classifying.

11. The method of claim 10, further comprising:
    clearing the graphics processing unit reference bit from each page table entry associated with the set of pages.

12. The method of claim 10, further comprising:
waiting a time period before re-determining the set of pages to be analyzed.

13. The method of claim 10, wherein each page in the set of pages is a contiguous block of virtual memory.

14. The method of claim 10, wherein the classification of each page is based on if the graphics processing unit reference bit is set in a page table entry associated with that page.

15. The method of claim 14, wherein the graphics processing unit reference bit for a page table entry indicates whether a graphics processing unit has accessed a virtual memory associated with the page table entry.

16. The method of claim 14, wherein the classification of each page is based on if the modification bit is set in a page table entry associated with that page.

17. The method of claim 10, wherein the eviction comprises:
determining a subset of pages from the set of pages that have a common classification;
randomly selecting one of the pages from the subset of pages; and
evicting the selected page.

18. The method of claim 10, wherein the evicting of a page comprises:
storing contents of the page from physical memory to persistent storage.

19. A data processing system comprising:
a central processing unit (CPU);
a graphics processing unit (GPU) coupled to the central processing unit;
a memory coupled to the central processing unit and the graphics processing unit, the memory storing executable instructions that when executed cause at least one of the CPU and the GPU to determine a set of pages used by the GPU to be analyzed and to classify the set of pages based on at least a GPU reference bit and a modification bit associated with the set of pages into a set of at least four classes and to evict a page in the set of pages from one of the set of at least four classes based on the classification.

20. The system of claim 19, wherein each page in the set of pages is a contiguous block of virtual memory and wherein the classification of each page is based on if the graphics processing unit reference bit is set in a page table entry associated with that page, and wherein the graphics processing unit reference bit for a page table entry indicates whether a graphics processing unit has accessed a virtual memory associated with the page table entry.

* * * * *